(12) United States Patent
Fourie

(10) Patent No.: US 9,342,100 B2
(45) Date of Patent: May 17, 2016

(54) TORSIONAL HOUSING RIGIDITY

(71) Applicant: GOOGLE INC., Mountain View, CA (US)

(72) Inventor: Daniel Fourie, San Mateo, CA (US)

(73) Assignee: Google Inc., Mountain View, CA (US)

( * ) Notice: Subject to any disclaimer, the term of this patent is extended or adjusted under 35 U.S.C. 154(b) by 370 days.

(21) Appl. No.: 13/706,165

(22) Filed: Dec. 5, 2012

(65) Prior Publication Data

US 2014/0153179 A1    Jun. 5, 2014

(51) Int. Cl.
*H05K 5/00* (2006.01)
*G06F 1/16* (2006.01)
*H04M 1/18* (2006.01)

(52) U.S. Cl.
CPC ............ *G06F 1/1613* (2013.01); *G06F 1/1656* (2013.01); *H04M 1/185* (2013.01); *Y10T 29/49002* (2015.01)

(58) Field of Classification Search
CPC ..... G06F 1/1662; G06F 1/162; G06F 1/1681; G06F 19/3462; G06F 1/1616; G06F 1/1626; G06F 1/1639; G06F 1/1647; G06F 1/1654; G06F 1/169; G06F 1/187; G06F 3/0233; G06F 3/0236; G06F 3/0338; G06F 3/03548; G06F 3/0488; G06F 1/1637; G06F 1/1613; G06F 1/1656; H05K 7/1489; H05K 7/1407; H05K 7/1408; H05K 7/1494; H05K 7/20745; H05K 9/0007; H05K 5/03; Y10T 29/49002; H04M 1/185
USPC ............. 361/679.01, 679.02, 679.09, 679.21, 361/679.27, 679.08, 679.31, 361/679.32–679.39; 312/223.1–223.2, 312/223.6; 29/592.1
See application file for complete search history.

(56) References Cited

U.S. PATENT DOCUMENTS

| 5,505,533 | A  | * | 4/1996 | Kammersqard et al. ...... 312/236 |
| 6,078,495 | A  | * | 6/2000 | Cipolla et al. ........... 361/679.46 |
| 6,216,988 | B1 | * | 4/2001 | Hsu et al. ...................... 248/118 |

(Continued)

FOREIGN PATENT DOCUMENTS

| JP | 2007-194545 A | 8/2007 |
| WO | 0254725 A1 | 7/2002 |

OTHER PUBLICATIONS

International Search Report and Written Opinion for International Application No. PCT/US2013/073294, mailed Feb. 19, 2014, 11 pages.

(Continued)

*Primary Examiner* — Anthony Haughton
*Assistant Examiner* — Ingrid Wright
(74) *Attorney, Agent, or Firm* — Brake Hughes Bellermann LLP

(57) ABSTRACT

In accordance with aspects of the disclosure, a device may include a base member formed as a receptacle with a recess defining an interior region configured for receiving internal circuitry. The base member may include first and second sides intersecting orthogonally to define a corner. The device may include a rail member having a first portion coupled to the first side of the base member and a second portion coupled to the second side of the base member. The rail member may be positioned to contact the corner of the base member. The device may include an enclosing member coupled to the first and second portions of the rail member with a plurality of fasteners to thereby enclose the internal circuitry disposed in the recess of the base member between the enclosing member and the base member.

23 Claims, 21 Drawing Sheets

(56) References Cited

U.S. PATENT DOCUMENTS 6,532,149 B2 * 3/2003 Dhar et al. ............... 361/679.09
6,900,984 B2 * 5/2005 Merz et al. ............... 361/679.55
8,422,212 B2 * 4/2013 Liu et al. .................. 361/679.17

2003/0184961 A1 10/2003 Ahn

OTHER PUBLICATIONS

International Preliminary Report on Patentability from corresponding application PCT/US2013/073294, dated Jun. 18, 2015, 8 pages.

* cited by examiner

TORSIONAL HOUSING RIGIDITY

TECHNICAL FIELD

The present disclosure relates to torsional housing rigidity of enclosure assemblies for computing devices.

BACKGROUND

In recent trends, portable computing devices are becoming thinner due in part to user demand. Conventional computer assemblies having thin profiles are typically made of pliable materials that may fail to resist bending and torsional strains, which may cause operating problems and unreliability in internal circuitry. For instance, as laptop form factors become thinner, it may be beneficial to preserve structural stiffness of shell casings to improve device resiliency against damage. Conventional laptop enclosures are increasingly inadequate due to their essentially thin shell casings without rigid coupling therebetween. As such, there exists a need to improve integrity and reliability of computer assemblies by increasing strength and rigidity of these computer assemblies.

SUMMARY

In accordance with aspects of the disclosure, a device may be provided for torsional housing rigidity. The device may include a base member formed as a receptacle with a recess defining an interior region configured for receiving internal circuitry. The base member may include a first side and a second side coupled to the first side. The first and second sides may be aligned along orthogonal first and second lines, respectively, and intersect orthogonally to define a corner of the base member. The device may include a rail member having a first portion coupled to the first side of the base member and a second portion coupled to the second side of the base member, the rail member positioned to contact the corner of the base member. The device may include an enclosing member coupled to the first and second portions of the rail member with a plurality of fasteners to thereby enclose the internal circuitry disposed in the recess of the base member between the enclosing member and the base member.

In accordance with aspects of the disclosure, a method may be provided for assembling a computing device with torsional housing rigidity. The method may include forming a base member of the computing device as a receptacle with a recess defining an interior region configured for receiving internal circuitry. The base member may include a first side and a second side coupled to the first side. The first and second sides may be aligned along orthogonal first and second lines, respectively, and intersect orthogonally to define a corner of the base member. The method may include coupling a first portion of a rail member to the first side of the base member and a second portion of a rail member to the second side of the base member, the rail member positioned to contact the corner of the base member. The method may include coupling an enclosing member to the first and second portions of the rail member with a plurality of fasteners to thereby enclose the internal circuitry disposed in the recess of the base member between the enclosing member and the base member.

In accordance with aspects of the disclosure, an apparatus may be provided for torsional housing rigidity. The apparatus may include internal circuitry including at least one processor and at least one memory. The first structural housing may be formed with at least one compartment defining an interior space configured for retaining the internal circuitry. The at least one compartment may include first and second interior sides that intersect orthogonally to form a corner. The apparatus may include a framing member coupled to the first and second interior sides of the at least one compartment and continuously bending within a contour of the corner. The framing member may include first and second elongated portions extending orthogonally from the corner. The apparatus may include a second structural housing formed as an enclosure for coupling to the first and second elongated portions of the framing member with a plurality of fasteners to thereby enclose the internal circuitry interposed between the first and second structural housings.

The details of one or more implementations are set forth in the accompanying drawings and the description below. Other features will be apparent from the description and drawings, and from the claims.

BRIEF DESCRIPTION OF THE DRAWINGS

FIG. 6D-3 is a diagram illustrating an exploded view of a device, in accordance with aspects of the disclosure.

DETAILED DESCRIPTION

In accordance with aspects of the disclosure, torsional housing rigidity of computing device enclosures (e.g., portable laptop device enclosures) may be increased with mechanical stressing and materials. For instance, a torsion box architecture may be implemented to increase stiffness of a laptop enclosure for resisting torsional strains, such as opposing end-to-end twisting of the laptop enclosure. In an example, upper and lower rectangular plates (e.g., thin stainless steel membranes, skins, etc.) may be coupled and securely fastened around their periphery to upper and lower portions of a rectangular perimeter frame or ring. In this example, one of the plates may be tightened down around its perimeter similar to a drum to pre-tension and pre-stress the rectangular plates to increase an overall stiffness of the enclosure.

FIGS. 1A-1L are block diagrams illustrating an example device having torsional housing rigidity, in accordance with aspects of the disclosure.

Figure 1A:
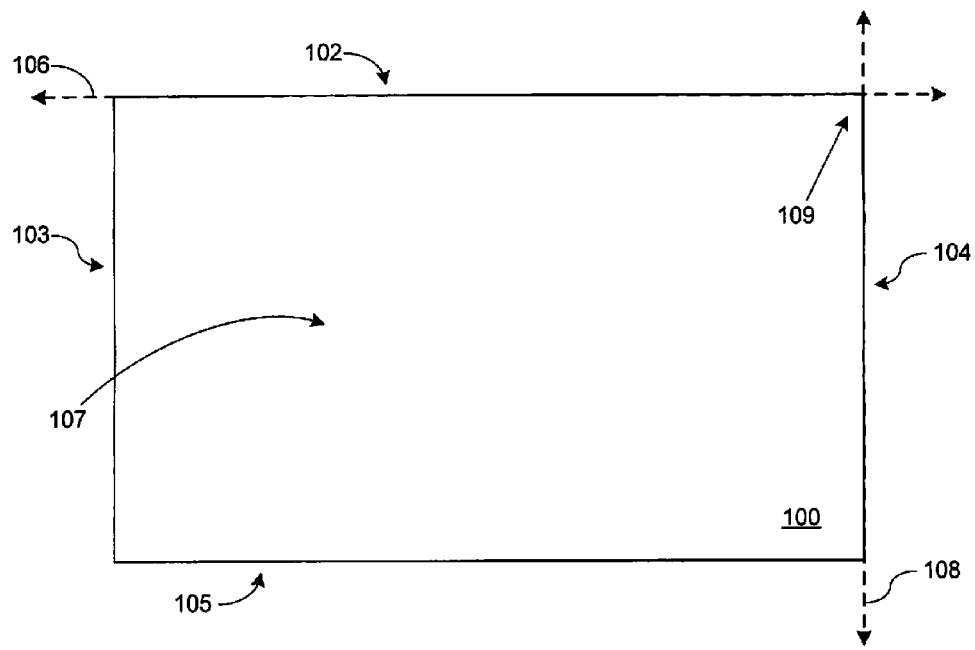
FIGS. 1A-1L are block diagrams illustrating example devices having torsional housing rigidity, in accordance with aspects of the disclosure.

In particular, FIG. 1A is a block diagram illustrating an example base member 100 for an example device or apparatus, such as a computing device. In various examples, the base member 100 may be referred to as a housing and/or an enclosure including any type of structure that may be used as a housing and/or an enclosure. In an example, the base member 100 may be formed to include and define one or more exterior side surfaces of the device such that the housing and/or enclosure provided by the base member 100 may include and define multiple exterior side surfaces and at least one exterior bottom surface of the device.

The base member 100 may include a first side 102 and a second side 104 coupled to the first side 102. The first side 102 may be aligned along a first line 106, and the second side 104 may be aligned along a second line 108 that is orthogonal to the first line 106. As shown in FIG. 1A, the first and second sides 102, 104 may be aligned along the orthogonal first and second lines 106, 108, respectively, and intersect orthogonally to define a corner 109 of the base member 100.

Further, as shown in FIG. 1A, along with the first and second sides 102, 104, the base member 100 may include third 103 and fourth sides 105. In an example, the four sides 102, 103, 104, 105 may be coupled to form a rectangular structure having four corners including the corner 109 that are right-angled corners (i.e., 90° angular corners) where the sides orthogonally intersect.

In an implementation, the base member 100 may be formed as a receptacle (e.g., bucket, container, etc.) with a recess 107 defining an interior region (e.g., area, space, cavity, compartment, etc.) configured for receiving internal circuitry including, for example, at least one processor and at least one memory.

In reference to the base member 100 being formed as a receptacle, bucket, container, etc., the four sides 102, 103, 104, 105 of the base member 100 may include four sidewalls that couple together to form the rectangular structure of the base member 100 and further to form a depth or thickness to the base member 100 to define the interior region, area, space, cavity, compartment, etc. In this instance, the base member 100 may include a bottom sidewall that spans the rectangular area of the base member 100 to thereby define the receptacle, bucket, container, etc. structure of the base member 100. In an example, the receptacle structure of the base member 100 including the four sides 102, 103, 104, 105 being formed as sidewalls may include an interior surface and an exterior surface such that the housing and/or enclosure provided by the base member 100 includes and defines exterior side surfaces and a bottom surface of the device.

Figure 2A:
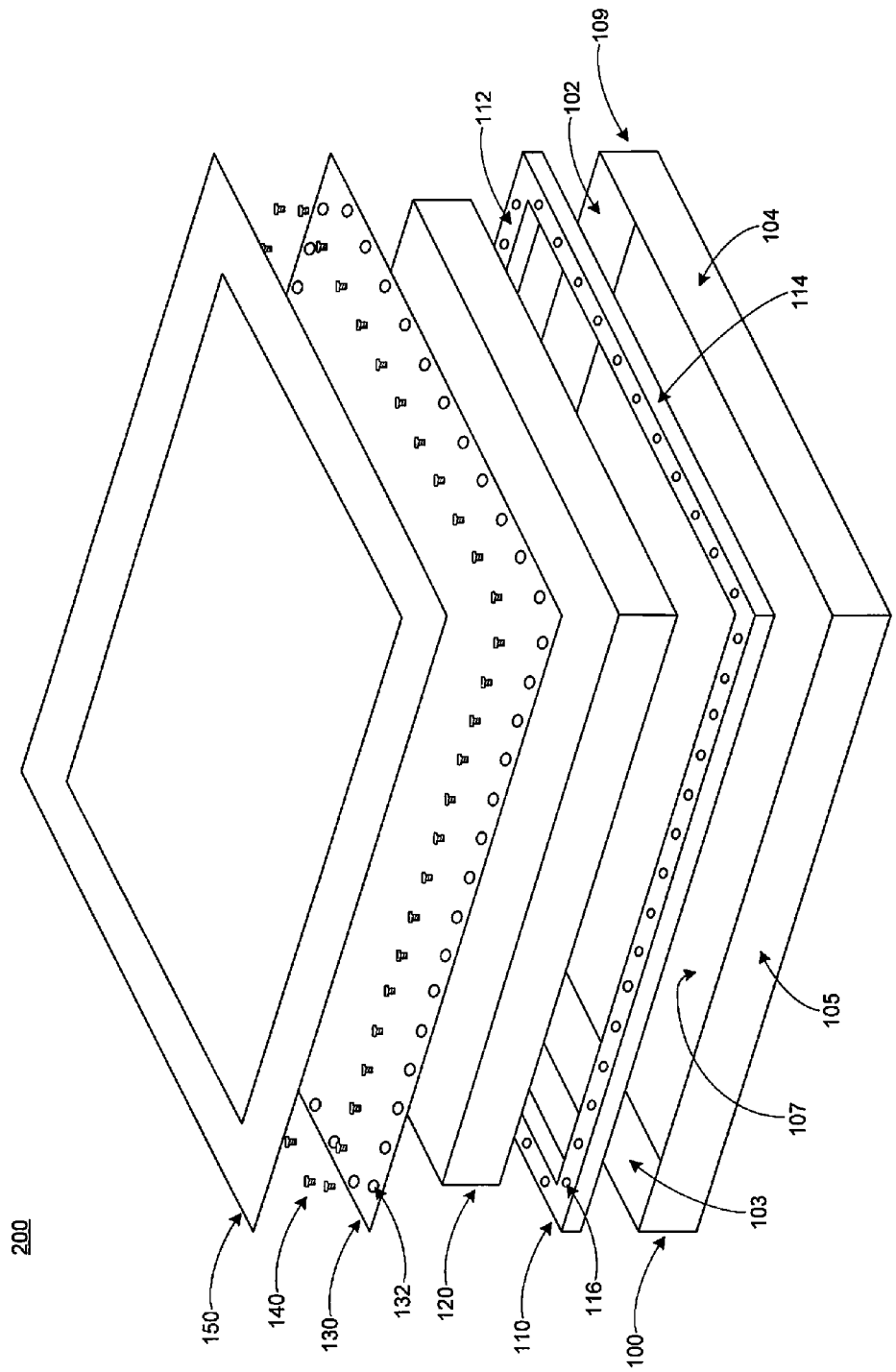
FIG. 2A-2B are diagrams illustrating an example device having torsional housing rigidity, in accordance with aspects of the disclosure.

The base member 100 may include a rigid material membrane, such as, for example, a stainless steel membrane. In an example, the base member 100 may include at least one of aluminum, titanium, magnesium, and chromoly. In another example, the base member 100 may include at least one of a polymer, plastic, and resin. In various examples, the base member 100 may be formed with a thickness (e.g., as shown in FIG. 2A) in a range of and including 0.005 mm to 5 mm. In some examples, the base member 100 may be formed with a thickness in a range of and including 0.15 mm to 0.4 mm. In another example, the base member 100 may be formed with a thickness of approximately 0.2 mm or less.

Figure 1B:
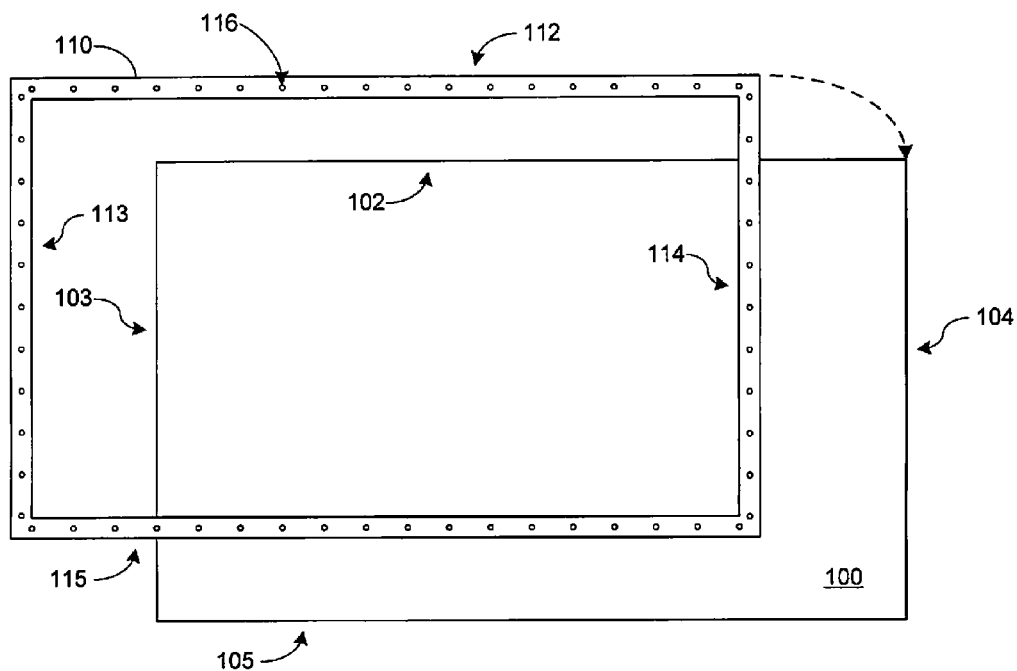

FIG. 1B is a block diagram illustrating an example rail member 110 being coupled to (e.g., assembled to) the base member 100 of FIG. 1A.

Figure 4A:
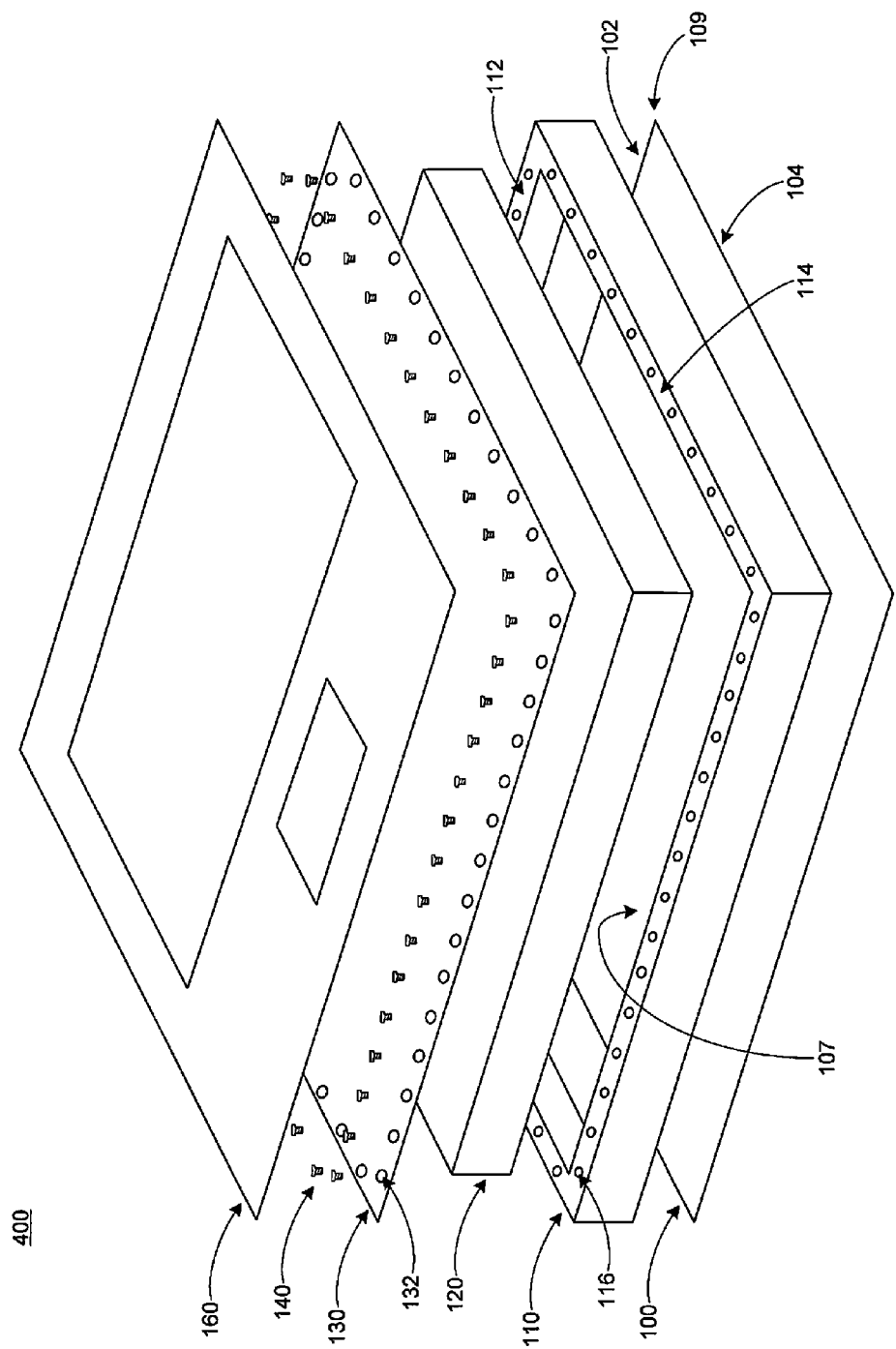
FIG. 4A-4B are diagrams illustrating still another example device having torsional housing rigidity, in accordance with aspects of the disclosure.

The rail member 110 may include a first portion 112 coupled to the first side 102 of the base member 100 and a second portion 114 coupled to the second side 104 of the base member 100. In an example, the rail member 110 may be coupled to interior surfaces of the first and second sides 102, 104 (or sidewalls) of the base member 100 (for instance, as shown in FIG. 2A). In another example, the rail member 110 may be coupled to a top surface of the base member 100 adjacent the first and second sides 102, 104 of the base member 100 (for instance, as shown in FIG. 4A). The rail member 110 may be positioned to contact the corner 109 of the base member 100. As shown in FIG. 1B, the rail member 110 includes a plurality of recesses 116 having threads formed in the rail member 110. In some examples, the rail member 110 may include and may be referred to as a perimeter rail that frames a perimeter of the base member 100.

Further, as shown in FIG. 1B, along with the first and second portions 112, 114, the base member 110 may include third 113 and fourth portions 115. In an example, the four portions 112, 113, 114, 115 may be coupled to form a rectangular structure having four corners that are right-angled corners (i.e., 90° angular corners) where the portions orthogonally intersect. In an example, as shown in FIG. 1B, the four corners of the rail member 110 may correspond to and may be aligned with the four corners of the base member 100 when assembled thereto.

Figure 1C:
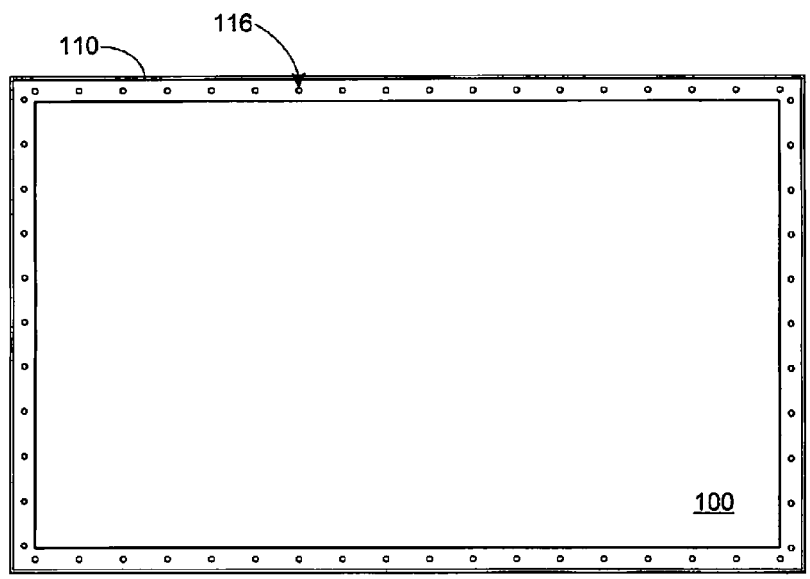

FIG. 1C is a block diagram illustrating the rail member 110 coupled to the base member 100 of FIG. 1A. In an implementation, the coupling of the rail member 110 to the base member 100 may be referred to as an assembly of the base member 100 and the rail member 110. The rail member 110 may be coupled to the base member 100 with at least one of a bonding agent, an adhesive, glue, solder, and at least one fastener including at least one of a rivet and a screw. In an example, the rail member 110 may include at least one of aluminum, titanium, magnesium, chromoly, and stainless steel. In another example, the rail member 110 may include at least one of a polymer, plastic, and resin.

In an example, the rail member 110 may include an elongated bar that extends along the first and second sides 102, 104 of the base member 100 and contacts the corner 109 of the base member 100. In another example, the rail member 110 may include an interior frame that extends along one or more sides of the base member 100 including, for example, the first and second sides 102, 104 of the base member 100 and contacts the corner 109 of the base member 100. In some examples, the rail member 110 may be referred to as a perimeter rail that frames a perimeter of the base member 100, for example, along an interior perimeter surface of the base member 100 (e.g., as shown in FIG. 2A), or in another example, along a top perimeter surface of the base member 100 (e.g., as shown in FIG. 4A).

Figure 1D:
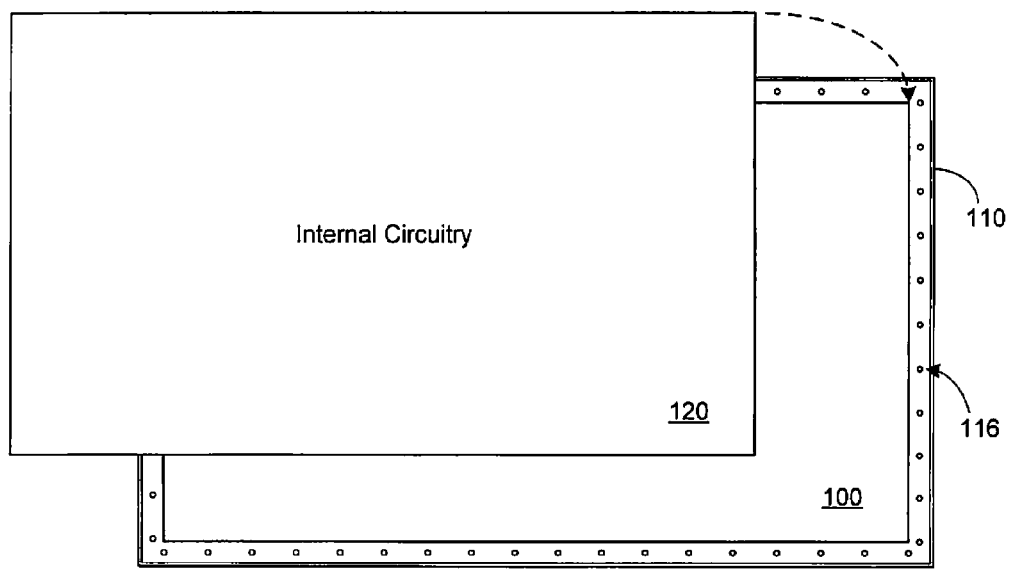
Figure 1E:
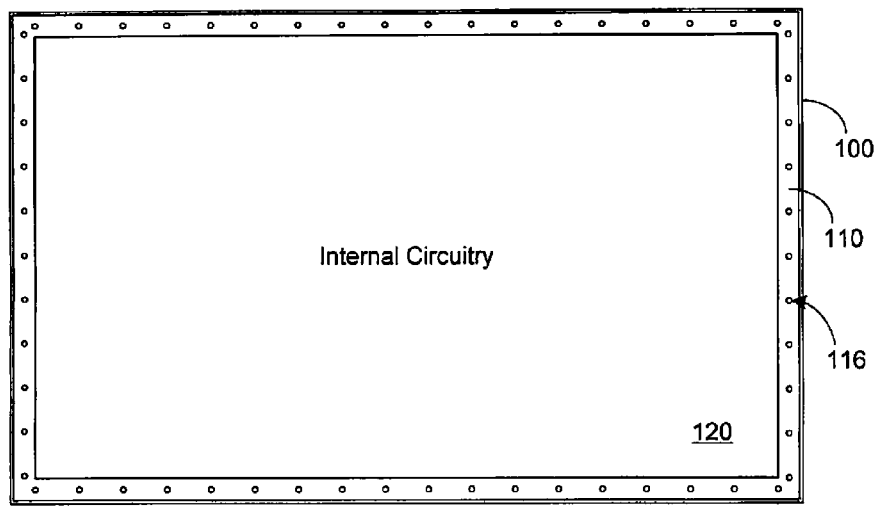

FIG. 1D is a block diagram illustrating an example internal circuitry 120 being coupled to (e.g., assembled to) the base member 100 of FIG. 1A, and FIG. 1E is a block diagram illustrating the internal circuitry 120 coupled to the base member 100. The internal circuitry 120 may be coupled to the rail member 110. In an implementation, the coupling of the internal circuitry 120 to the base member 100 may be referred to as an assembly of the base member 100, the rail member 110, and the internal circuitry 120.

In an implementation, the base member 100 may be formed as a receptacle with a recess defining an interior region configured for receiving the internal circuitry 120. Further, the first portion 112 of the rail member 110 may be coupled to an interior portion of the first side 102 of the base member 100 facing the recess, and the second portion 114 of the rail member 110 may be coupled to an interior portion of the second side 104 of the base member 100 facing the recess.

Figure 1F:
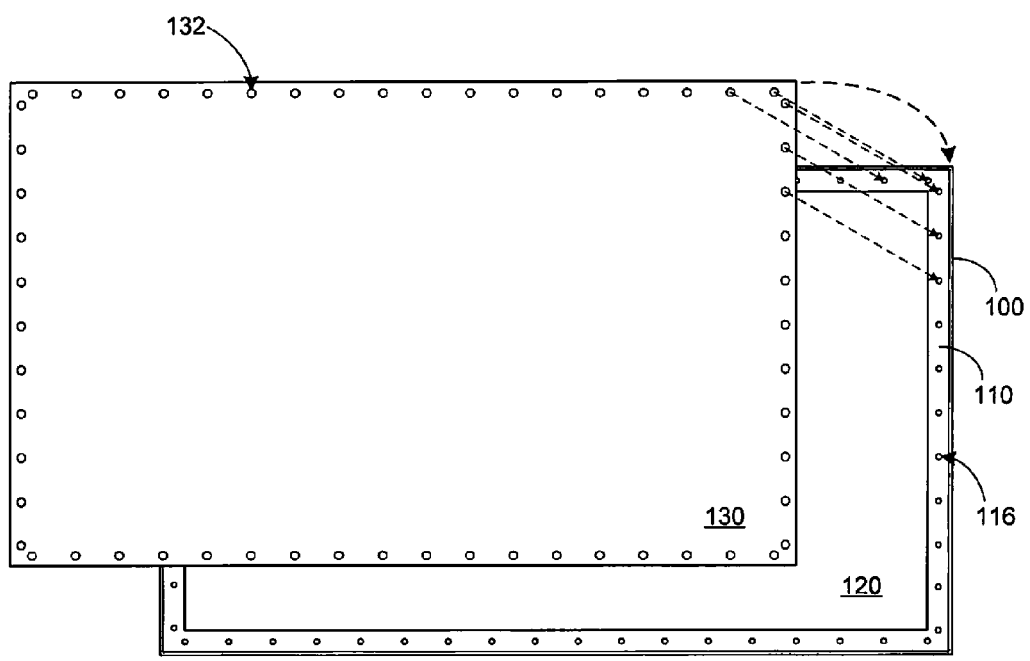
Figure 1G:
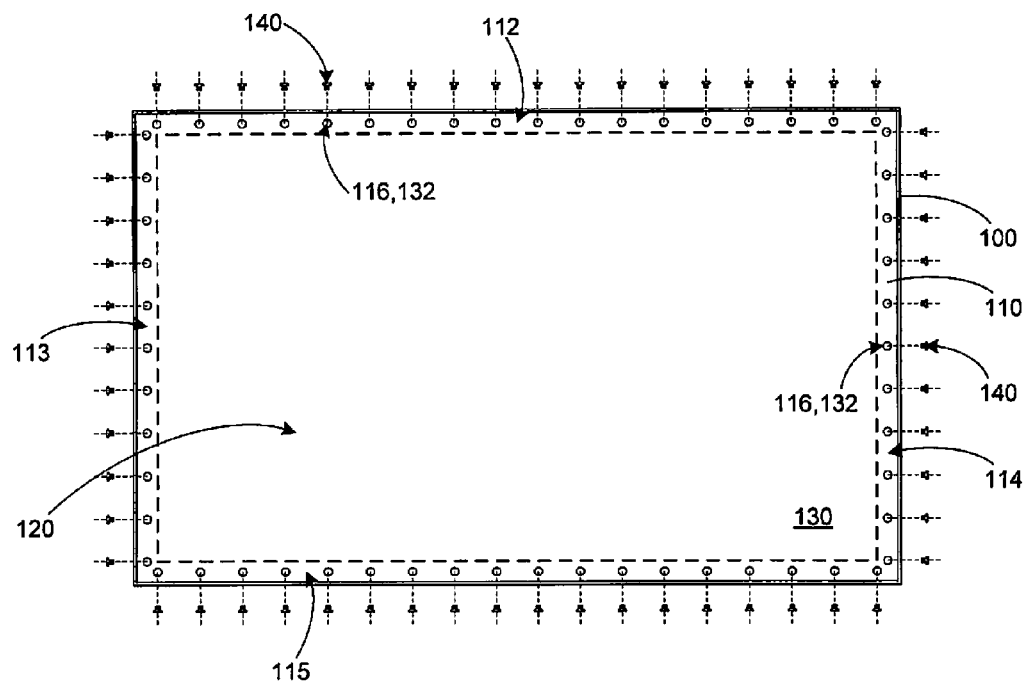

FIG. 1F is a block diagram illustrating an example enclosing member being coupled to (e.g., assembled to) the rail member 110, and FIG. 1G is a block diagram illustrating the enclosing member 130 coupled to the rail member 110.

In an implementation, the coupling of the enclosing member 130 to the rail member 110 may be referred to as an assembly of the base member 100, the rail member 110, the internal circuitry 120, and the enclosing member 130.

As shown in FIG. 1G, the enclosing member 130 may be coupled to the first and second portions 112, 114 of the rail member 110 with a plurality of fasteners 140 to thereby enclose the internal circuitry 120 disposed in the recess of the base member 100 between the enclosing member 130 and the base member 100.

In an implementation, the fasteners 140 being coupled to the rail member 110 may be referred to as an assembly of the base member 100, the rail member 110, the internal circuitry 120, and the enclosing member 130 with the fasteners 140. In this example, the assembly when assembled with the plurality of fasteners 140 provides torsional housing rigidity.

In an example, the enclosing member 130 may be formed as a flat sheet for coupling with the rail member 110 with the internal circuitry 120 disposed between the enclosing member 130 and the base member 100. In another example, the enclosing member 130 may be formed as a receptacle similar to the base member 100 so as to provide an upper receptacle structure to couple with the base member 100 that may be formed as a lower receptacle structure. In another example, the enclosing member 130 may include a rigid material membrane, such as, for example, a stainless steel membrane. In another example, the enclosing member 130 may include at least one of aluminum, titanium, magnesium, and chromoly. In another example, the enclosing member 130 may include at least one of a polymer, plastic, and resin.

In various examples, the enclosing member 130 may be formed with a thickness within a range of and including 0.005 mm to 5 mm. In some examples, the enclosing member 130 may be formed with a thickness in a range of and including 0.15 mm to 0.4 mm. In another example, the enclosing member 130 may be formed with a thickness of approximately 0.2 mm or less.

The enclosing member 130 may include a plurality of openings 132 formed in the enclosing member 130. As shown in FIG. 1F, the openings 132 of the enclosing member 130 may be aligned with the recesses 116 of the rail member 110. As shown in FIG. 1G, the openings 132 of the enclosing member 130 may be positioned over the recesses 116 of the rail member 110, and the enclosing member 130 may be coupled to the rail member 110 with the fasteners 140 positioned through the openings 132 formed in the enclosing member 130 to thereby enclose the internal circuitry 120. In an implementation, the fasteners 140 may include screws configured to couple with the recesses 116 having threads formed in the rail member 110 corresponding to the openings 132 formed in the enclosing member 130. In various implementations, the fasteners 140 may include rivets, anchors, snaps, adhesives, etc.

In accordance with aspects of the disclosure, any number of fasteners 140 may be used to provide torsional housing rigidity to the assembly of the base member 100, the rail member 110, and the enclosing member 130. For example, one fastener 140 may be used or two fasteners 140 may be used. However, the use of two fasteners 140 may provide more torsional housing rigidity than the use of one fastener 140. Similarly, in another example, three fasteners 140 may be used, and in this example, the use of three fasteners 140 may provide more torsional housing rigidity than the use of one or two fasteners 140. Thus, any number of fasteners 140 may be used to couple the enclosing member 130 to the rail member 110 with the use of more fasteners 140 providing more torsional housing rigidity to the assembly of the base member 100, the rail member 110, and the enclosing member 130.

In accordance with aspects of the disclosure, any number of fasteners 140 may be used and may be spaced apart by any distal length (e.g., whether equally or unequally spaced apart) to provide torsional housing rigidity to the assembly of the base member 100, the rail member 110, and the enclosing member 130. For example, two or more fasteners 140 positioned on and coupled to any one side of the assembly may be positioned anywhere along the rail member 110, equally or unequally spaced apart, and provide a first amount of torsional housing rigidity. In another example, three or more fasteners 140 positioned on and coupled to any one side of the assembly may be positioned anywhere along the rail member 110, equally or unequally spaced apart, and provide a second amount of torsional housing rigidity that is at least greater than the first torsional housing rigidity. In another example, the fasteners 140 may be aligned along one or more lines formed along a perimeter of the enclosing member 130 corresponding to the sides 112, 113, 114, 115 of the rail member 110.

Therefore, in various examples, any number of fasteners 140 may be used to couple the enclosing member 130 to the rail member 110. The fasteners 140 may be positioned on and coupled to any one side of the assembly. The fasteners 140 may be positioned anywhere along the rail member 110, equally or unequally spaced apart, with the use of more fasteners 140 providing more torsional housing rigidity to the assembly of the base member 100, the rail member 110, and the enclosing member 130.

Figure 1H:
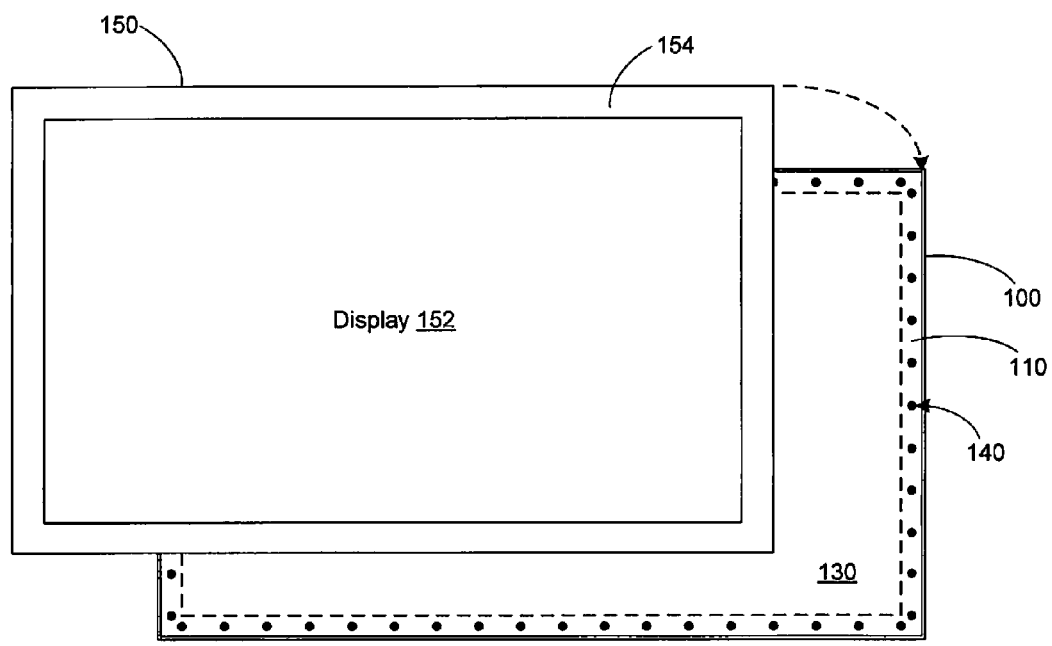

In an implementation, as shown in the example of FIGS. 1G and 1H, a plurality of fasteners 140 may be used to couple the enclosing member 130 to the rail member 110. The fasteners 140 may be positioned on and coupled to one or more sides of the assembly. The fasteners 140 may be positioned anywhere along the rail member 110 and equally spaced apart with the use of more fasteners 140 providing more torsional housing rigidity to the assembly of the base member 100, the rail member 110, and the enclosing member 130.

In accordance with aspects of the disclosure, torsional housing rigidity of the base assembly (e.g., coupling of the base member 100, the rail member 110, and the enclosing member 130 with the fasteners 140) may be increased with the torsion box architecture implemented to increase stiffness of the base assembly for resisting torsional strains, such as opposing end-to-end twisting the base assembly. As shown in FIGS. 1A-1G, the base and enclosing members 100, 130 (e.g., stainless steel membranes, skins, etc.) may be coupled and securely fastened around their periphery to upper and lower portions of the rail member 110 (e.g., rectangular perimeter frame). In this example, the enclosing member 130 may be tightened down around its periphery similar to a drum to increase an overall stiffness of the base assembly.

In some examples, the base and enclosing members 100, 130 may be less than or equal to 0.2 mm thick and span a rectangular area of at least 200 by 280 mm. The low thicknesses of the base and enclosing members 100, 130 provide for an interior space within the base assembly that is available for retaining the internal circuitry 120. In some other examples, other materials with high tensile stiffness may be used instead of the thin stainless steel plates of the base and enclosing members 100, 130.

In an implementation, the torsion box architecture may be used to increase torsional rigidity of the base assembly enclosure. The thin skins of the base member 110 and enclosing member 130 may deflect perceptibly inwards at the center, and because of this, the internal circuitry 120 may be used to fill the interior region of the base member 100 (e.g., with no air gaps) with components and/or standoffs. For example, one or more batteries may be adhered to the bottom of the base member 100 and touch the enclosing member 130, so that normal force may be transmitted from top to bottom of the base assembly enclosure. In another example, standoffs may be welded to the bottom of the base member 100 so that the enclosing member 130 may be fastened to the standoff after screwed to the perimeter rail member 110. In this example, this technique may provide a means for the standoff to take both normal and shear forces.

Figure 1I:
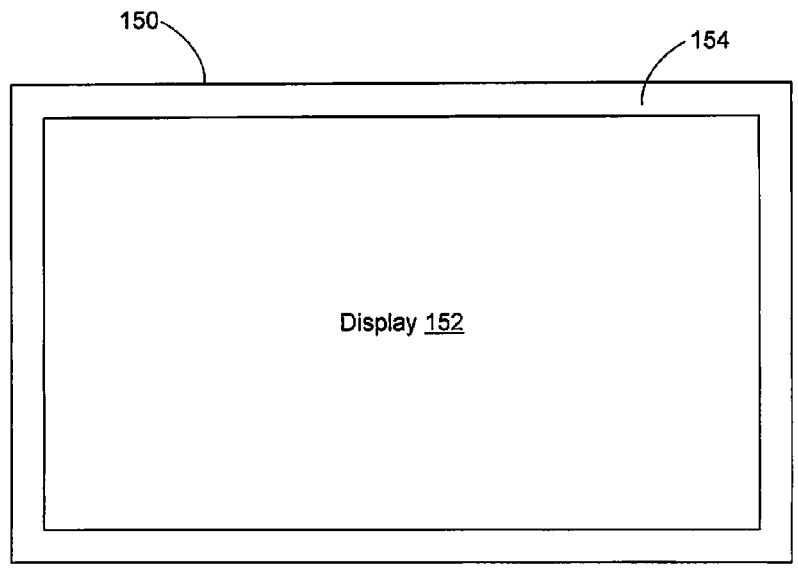

FIG. 1H is a block diagram illustrating an example display member 150 being coupled to (e.g., assembled to) the enclosing member 130, and FIG. 1I is a block diagram illustrating the display member 150 coupled to the enclosing member 130. In FIG. 1H, the fasteners 140 are shown coupled to the rail member 110 with the enclosing member 130 interposed between the fasteners 140 and the rail member 110.

In an implementation, the display member 150 may include a display 152 and a bezel 154. The display 152 may include a liquid crystal display (LCD). The display 152 may be configured as a touch display.

In another implementation, the display member 150 may include a sensor, such as, for example, one or more user interface components including at least one of a touch sensor (e.g., keyboard) and a track pad (e.g., a touch pad).

In the example of FIG. 1I, the assembly may include a device, such as, for example, a computing device or a portable computing device including at least one of a tablet and a mobile phone. Further, the internal circuitry 120 of the device may include at least one processor and at least one memory.

In an implementation, the coupling of the display member 150 to the enclosing member 130 may be referred to as an assembly of the base member 100, the rail member 110, the internal circuitry 120, the enclosing member 130, and the display member 150. In various examples, the assembly shown in the example of FIG. 1I may be referred to as a base assembly, housing assembly, and/or an enclosure assembly including any type of structural assembly that may be used as a housing and/or an enclosure. As described herein, the assembly when assembled with the plurality of fasteners 140 provides torsional housing rigidity.

Figure 1J:
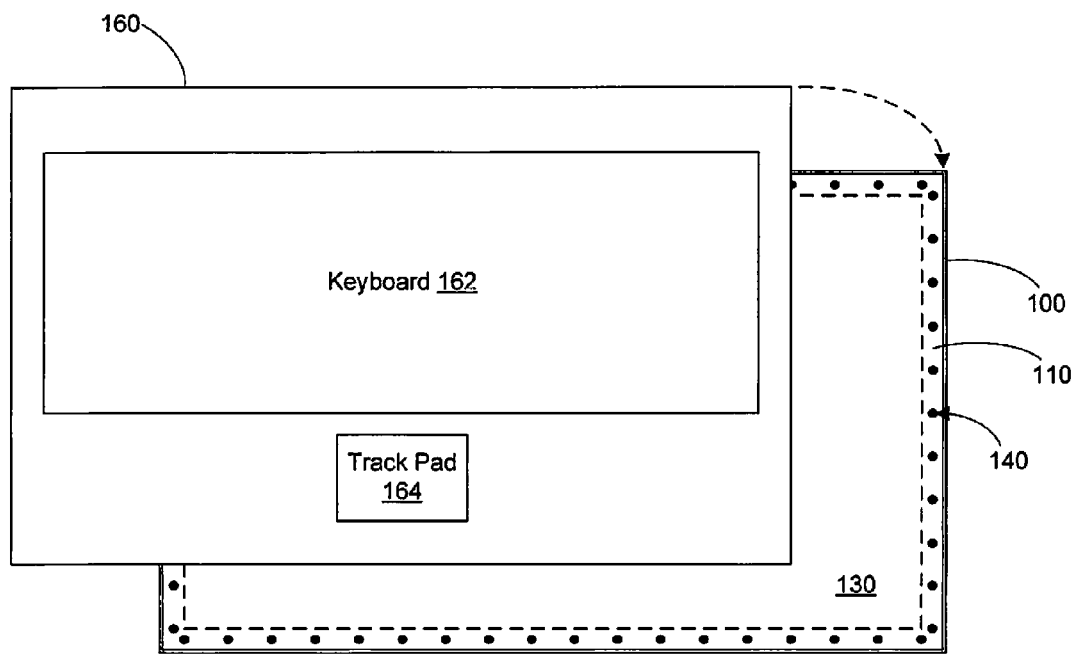
Figure 1K:
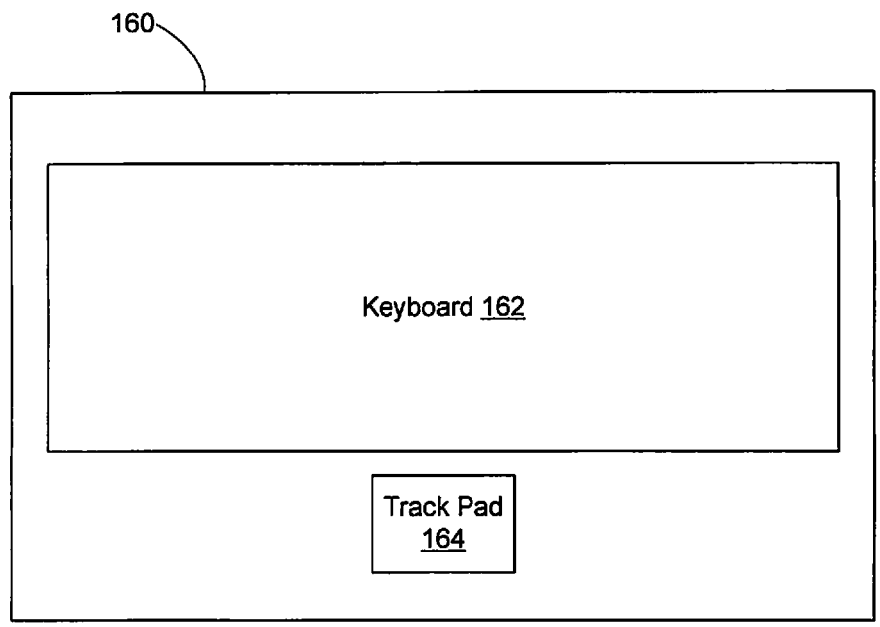
Figure 1L:
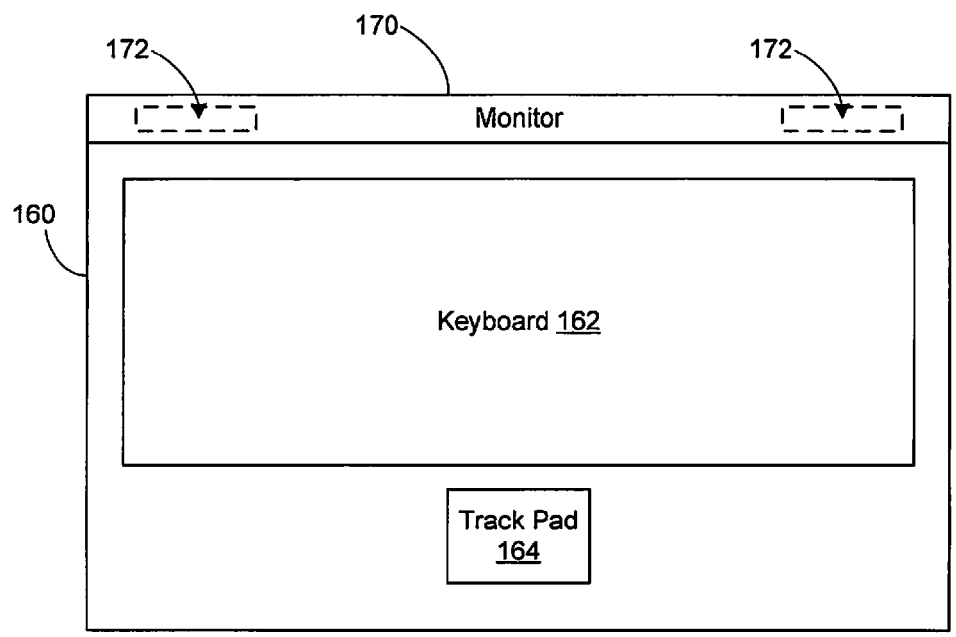

FIG. 1J is a block diagram illustrating an example user interface member 160 being coupled to (e.g., assembled to) the enclosing member 130, FIG. 1K is a block diagram illustrating the user interface member 160 coupled to the enclosing member 130, and FIG. 1L is a block diagram illustrating a monitor member 170 coupled to the base member assembly with one or more hinges 172. In FIG. 1J, the fasteners 140 are shown coupled to the rail member 110 with the enclosing member 130 interposed between the fasteners 140 and the rail member 110.

In an implementation, the user interface member 160 may include one or more user interface components including at least one of keyboard 162 (e.g., a touch sensor) and a track pad 164 (e.g., a touch pad). Further, in another implementation, the monitor member 170 may include one or more display components, such as, for example, a monitor (e.g., a display) and a bezel. The monitor or display may include a liquid crystal display (LCD). The monitor or display may be configured as a touch display.

In the example of FIG. 1L, the assembly may include a device, such as, for example, a computing device or a portable computing device including at least one of a laptop and a mobile phone. Further, the internal circuitry 120 of the device may include at least one processor and at least one memory.

In an implementation, the coupling of the user interface member 160 to the enclosing member 130 may be referred to as an assembly of the base member 100, the rail member 110, the internal circuitry 120, the enclosing member 130, and the user interface member 160 including the monitor member 170. In various examples, the assemblies shown in the examples of FIGS. 1K, 1L may be referred to as a base assembly, housing assembly, and/or an enclosure assembly including any type of structural assembly that may be used as a housing and/or an enclosure.

In another implementation, the coupling of the monitor member 170 to the base member assembly may be referred to as an assembly of the base member 100, the rail member 110, the internal circuitry 120, the enclosing member 130, the user interface member 160, and the monitor member 170. As described herein, the assembly when assembled with the plurality of fasteners 140 provides torsional housing rigidity.

In accordance with aspects of the disclosure, the device assembly of FIGS. 1A-1L may include any standard element(s), including at least one processor, memory (e.g., non-transitory computer-readable storage medium), power, peripherals, and various other elements not specifically shown in FIGS. 1A-1L. In some instances, various other elements of the device assembly that may be useful to implement the device assembly may be added or included, without departing from the scope of the disclosure.

Figure 2B:
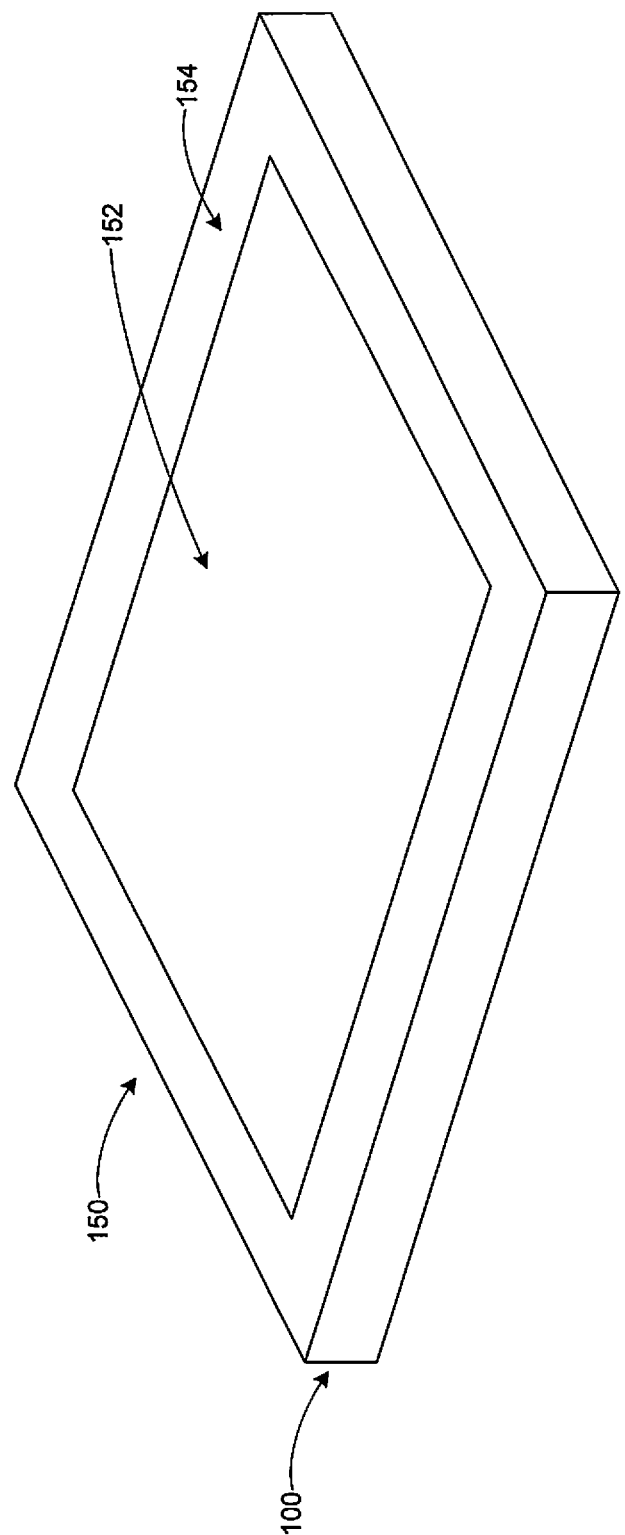

FIG. 2A-2B are diagrams illustrating an example device 200 having torsional housing rigidity, in accordance with aspects of the disclosure.

In particular, FIG. 2A shows an exploded view of an example device 200 having torsional housing rigidity, and FIG. 2B shows an assembled view of the example device 200 having torsional housing rigidity. In various implementations, the assemblies shown in the examples of FIGS. 2A-2B may be referred to as a base assembly, housing assembly, and/or an enclosure assembly including any type of structural assembly that may be used as a housing and/or an enclosure.

In the example of FIG. 2A, the device 200 may include the base member 100 formed as a receptacle with the recess 107 defining the interior region configured for receiving the internal circuitry 120. The base member 100 may include the first side and the second side 104 coupled to the first side 102. The first and second sides 102, 104 may intersect orthogonally to define the corner 109 of the base member 100.

In reference to the base member 100 being formed as a receptacle, bucket, container, etc., the four sides 102, 103, 104, 105 of the base member 100 may include four sidewalls that couple together to form the rectangular structure of the base member 100 and further to form a depth or thickness to the base member 100 to define the interior region, area, space, cavity, compartment, etc. In this instance, the base member 100 may include a bottom sidewall that spans the rectangular area of the base member 100 to thereby define the receptacle, bucket, container, etc. structure of the base member 100. In the example of FIG. 2A, the receptacle structure of the base member 100 including the four sides 102, 103, 104, 105 being formed as sidewalls may include an interior surface and an exterior surface such that the enclosure provided by the base member 100 includes and defines exterior side surfaces and a bottom surface of the device.

The rail member 110 may include a frame having the first portion 112 coupled to the first side 102 of the base member 100 and the second portion 114 coupled to the second side 104 of the base member 100. The rail member 110 may be positioned to contact the corner 109 of the base member 100 when coupled thereto. In some examples, the rail member 110 may be referred to as a perimeter rail that frames a perimeter of the base member 100.

Figure 3A:
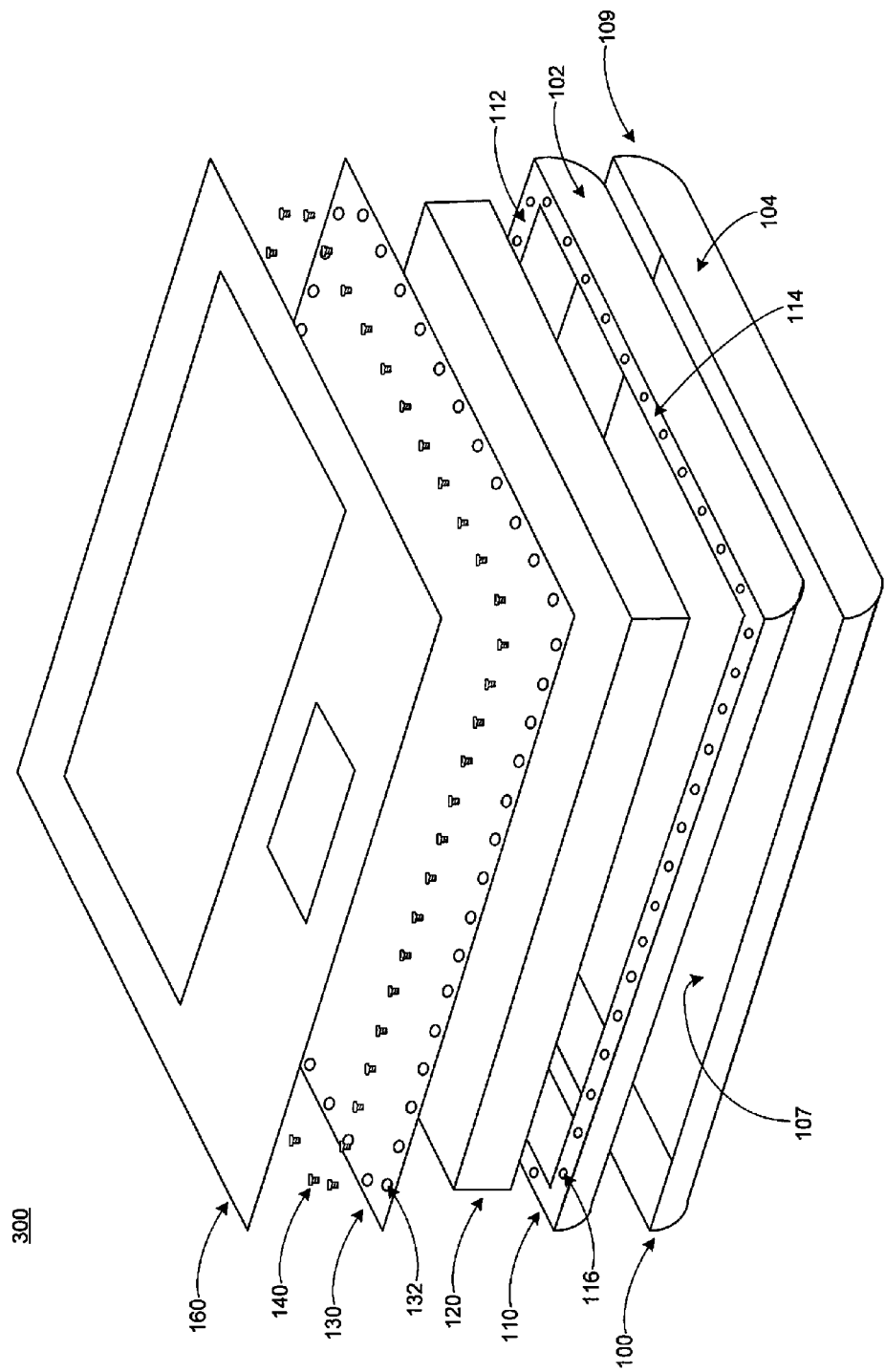
FIG. 3A-3B are diagrams illustrating another example device having torsional housing rigidity, in accordance with aspects of the disclosure.

In various examples, as described herein, the rail member 110 may include any thickness relative to a thickness of the base member 100. In an example, as shown in FIG. 2A, the thickness of the rail member 110 may be less than the thickness of the base member 100. In another example, as shown in FIG. 3A, the thickness of the rail member 110 may be similar or about equal to the thickness of the base member 100. As such, the ratio of the thickness of the rail member 110 to the base member 100 may vary.

In another example, as shown in FIG. 4A, the rail member 110 may be configured to form one or more of the sidewalls of the base assembly, and the rail member 110 may be coupled to the base member 110 and the enclosing member 130 to form the base assembly. In this example, the thickness of the rail member 110 may provide the thickness of the base assembly when assembled. Further, in some examples, the ratio of the thickness of the rail member 110 to the base assembly may vary.

The enclosing member 130 may be coupled to the first and second portions 112, 114 of the rail member 110 with the fasteners 140 to thereby enclose the internal circuitry 120 disposed in the recess 107 of the base member 100 between the enclosing member 130 and the base member 100.

The enclosing member 130 may include the openings 132 formed in the enclosing member 130 for coupling the enclosing member 130 to the rail member 110 with the fasteners 140 positioned through the openings 132 formed in the enclosing member 130 to thereby enclose the internal circuitry 120 between the enclosing member 130 and the base member 100. The fasteners 140 may include screws configured to couple with the recesses 116 having threads formed in the rail member 110 corresponding to the openings 132 formed in the enclosing member 130. In various implementations, the fasteners 140 may include rivets, anchors, snaps, adhesives, etc.

As shown in FIG. 2A, the display member 150 may be coupled to the enclosing member 130. Further, as shown in FIG. 2B, the device 200 may include an assembly of the base member 100, the rail member 110, the internal circuitry 120, the enclosing member 130, the fasteners 140, and the display member 150. As described herein, the assembly when assembled with the plurality of fasteners 140 provides torsional housing rigidity.

In an implementation, as shown in the examples of FIGS. 2A-2B, the device 200 may be referred to as an apparatus including internal circuitry (e.g., internal circuitry 120) with at least one processor and at least one memory. The apparatus may include a first structural housing (e.g., base member 100) formed with at least one compartment (e.g., recess 107) defining an interior space (e.g., interior region) configured for retaining the internal circuitry 120. The at least one compartment (e.g., recess 107) may include first and second interior sides that intersect orthogonally to form a corner of the first structural housing (e.g., base member 100). The apparatus may include a framing member (e.g., rail member 110) coupled to the first and second interior sides of the at least one compartment (e.g., recess 107) and continuously bending within a contour of the corner of the first structural housing (e.g., base member 100). The framing member (e.g., rail member 110) may include first and second elongated portions extending orthogonally from the corner. The apparatus may include a second structural housing (e.g., enclosing member 130) formed as an enclosure for coupling to the first and second elongated portions of the framing member (e.g., rail member 110) with a plurality of fasteners (e.g., fasteners 140) to thereby enclose the internal circuitry (e.g., internal circuitry 140) interposed between the first structural housings (e.g., base member 100) and the second structural housing (e.g., enclosing member 130).

Figure 3B:
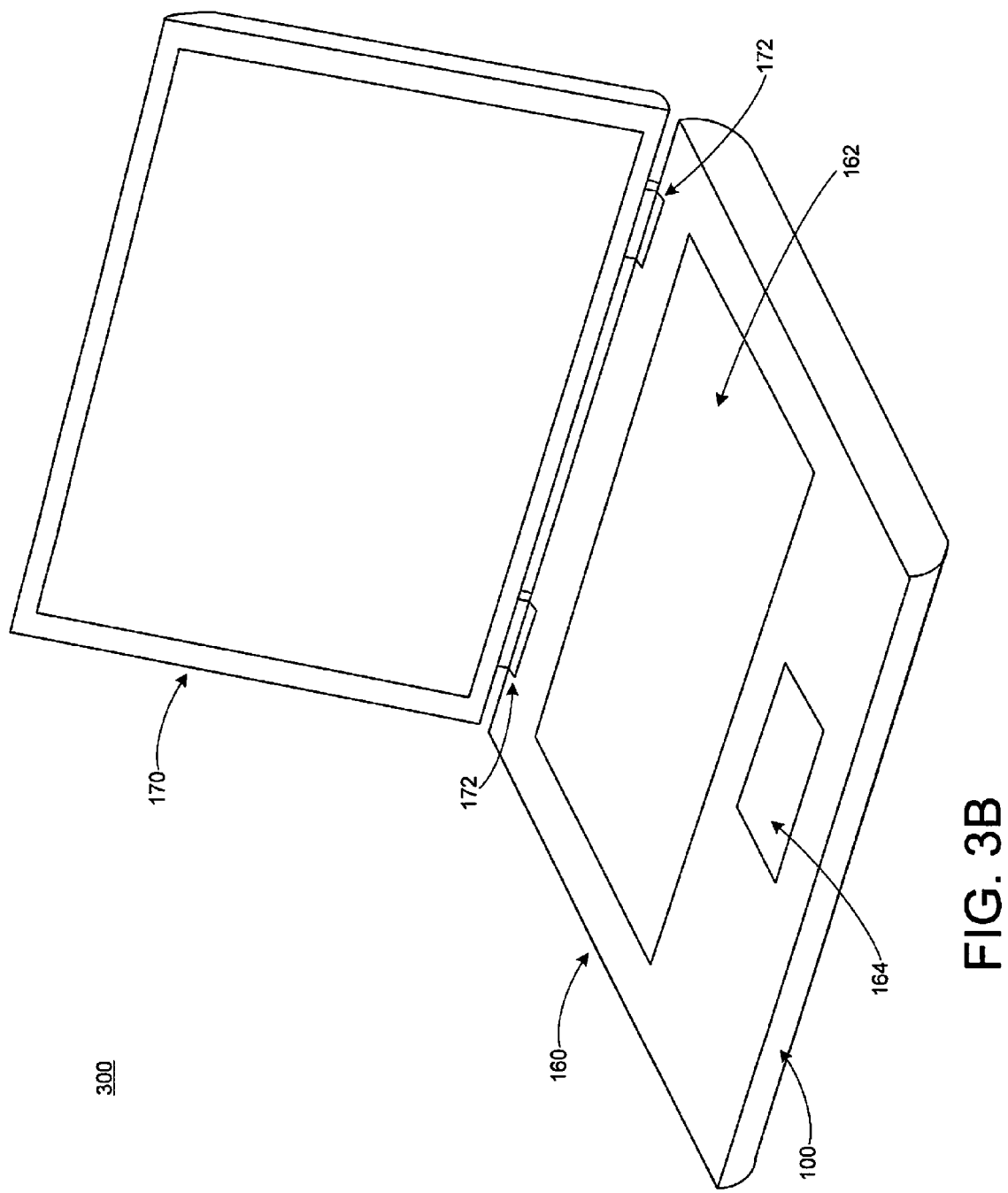

FIG. 3A-3B are diagrams illustrating another example device 300 having torsional housing rigidity, in accordance with aspects of the disclosure.

In particular, FIG. 3A shows an exploded view of an example device 300 having torsional housing rigidity, and FIG. 3B shows an assembled view of the example device 300 having torsional housing rigidity. In various implementations, the assemblies shown in the examples of FIGS. 3A-3B may be referred to as a base assembly, housing assembly, and/or an enclosure assembly including any type of structural assembly that may be used as a housing and/or an enclosure.

In the example of FIG. 3A, the base member 100 may include contoured sides 102, 103, 104, 105, and the rail member 110 may include contoured portions 112, 113, 114, 115 that are configured to couple with the sides 102, 103, 104, 105 of the base member 100 when assembled thereto. In some examples, the rail member 110 may be referred to as a perimeter rail that frames a perimeter of the base member 100.

In an implementation, the contoured features of the base member 100 provide an ergonomic aesthetic to the device 300. In various examples, the contoured features of the base member 100 may vary in shape and contour.

In the example of FIG. 3A, the user interface member 160 may be coupled to the enclosing member 130, and in the example of FIG. 3B, the monitor member 170 may be coupled to the base member assembly with the one or more hinges 172.

Further, in the example of FIG. 3B, the device 300 includes an assembly of the base member 100, the rail member 110, the internal circuitry 120, the enclosing member 130, the fasteners 140, the user interface member 160, and the monitor member 170 with the one or more hinges 172. As described herein, the assembly when assembled with the plurality of fasteners 140 provides torsional housing rigidity.

Figure 4B:
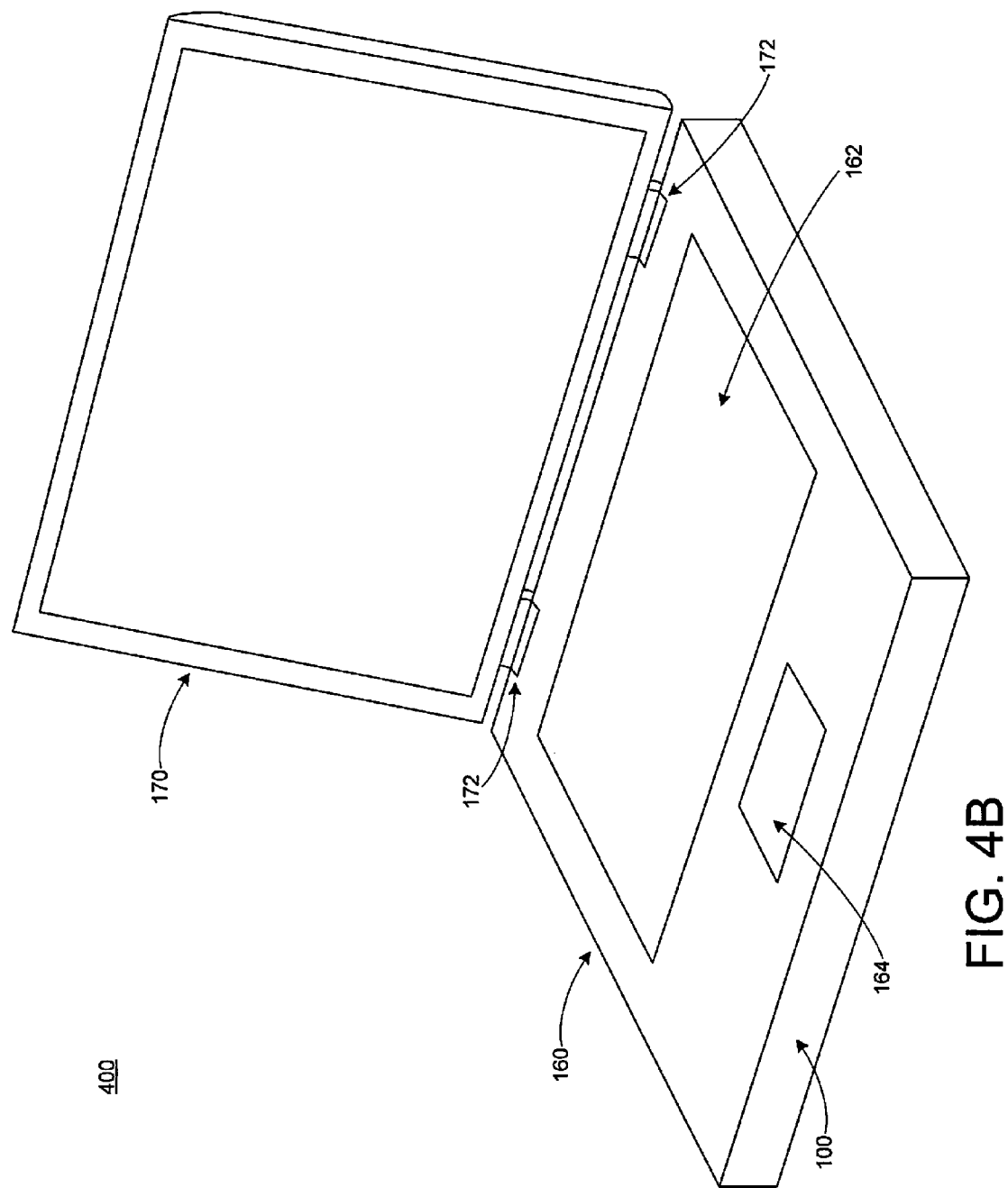

FIG. 4A-4B are diagrams illustrating another example device 400 having torsional housing rigidity, in accordance with aspects of the disclosure.

In particular, FIG. 4A shows an exploded view of an example device 400 having torsional housing rigidity, and FIG. 4B shows an assembled view of the example device 400 having torsional housing rigidity. In various implementations, the assemblies shown in the examples of FIGS. 4A-4B may be referred to as a base assembly, housing assembly, and/or an enclosure assembly including any type of structural assembly that may be used as a housing and/or an enclosure.

In the example of FIG. 4A, the base member 100 may be formed as a flat sheet (e.g., membrane, skin, etc.) for coupling with the rail member 110 with the internal circuitry 120 disposed within an interior region (e.g., area, space, cavity, compartment, etc.) of the rail member 100 interposed between the enclosing member 130 and the base member 100. Similar to the base member 100, the enclosing member 130 may be formed as a flat sheet (e.g., membrane, skin, etc.) for coupling with the rail member 110. In an example, the rail member 110 may include a perimeter frame that is sandwiched between the flat sheet structures of the base member 100 and the enclosing member 130, and as shown in FIGS. 4A-4B, the perimeter frame structure of the rail member 110 forms the exterior sidewall surface of the base assembly of the device. Thus, in some examples, the rail member 110 may be referred to as a perimeter rail that frames a perimeter of the assembly. In various examples, the base member 100 may be coupled to the rail member 110 with at least one of a bonding agent, an adhesive, glue, solder, and at least one fastener including at least one of a rivet and a screw.

In the example of FIG. 4A, the user interface member 160 may be coupled to the enclosing member 130, and in the example of FIG. 4B, the monitor member 170 may be coupled to the base member assembly with the one or more hinges 172.

Further, in the example of FIG. 4B, the device 300 includes an assembly of the base member 100, the rail member 110, the internal circuitry 120, the enclosing member 130, the fasteners 140, the user interface member 160, and the monitor member 170 with the one or more hinges 172. As described herein, the assembly when assembled with the plurality of fasteners 140 provides torsional housing rigidity.

Figure 5A:
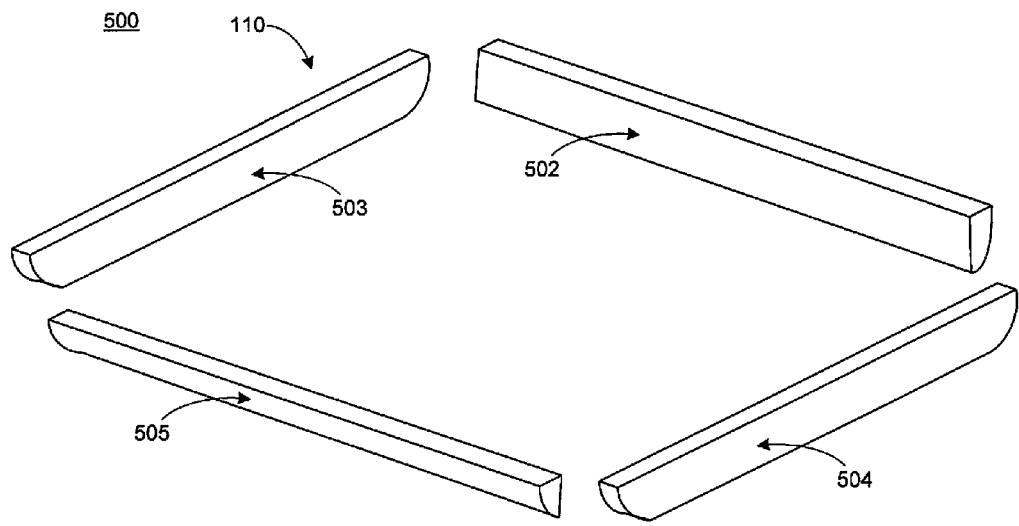
FIG. 5A-5B are diagrams illustrating an example structural member for an example device, in accordance with aspects of the disclosure.
Figure 5B:
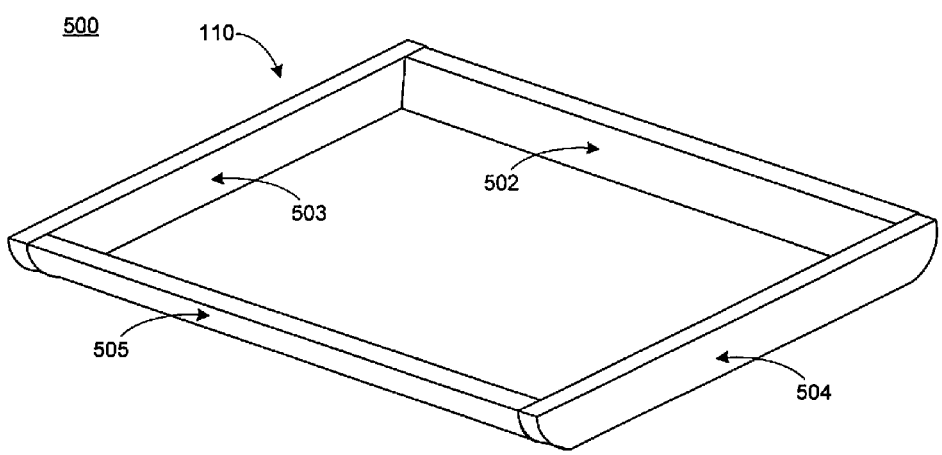

FIG. 5A-5B are diagrams illustrating an example structural member 500 for an example device, in accordance with aspects of the disclosure.

In the example of FIG. 5A, the structural member 500 may include an assembly of a plurality of component parts 502, 503, 504, 505 to form an embodiment of the rail member 110, as shown in FIG. 5B. In some examples, the rail member 110 may be referred to as a perimeter rail that frames a perimeter of the assembly.

In an implementation, the component parts 502, 503, 504, 505 of the rail member 110 may be coupled together with at least one of a bonding agent, an adhesive, glue, solder, and at least one fastener including at least one of a rivet and a screw. In an example, the component parts 502, 503, 504, 505 of the rail member 110 may include at least one of aluminum, titanium, magnesium, chromoly, and stainless steel. In another example, the component parts 502, 503, 504, 505 of the rail member 110 may include at least one of a polymer, plastic, and resin.

In an example, as described herein, the rail member 110 may include an elongated bar that extends along the first and second sides of the base member 100 and contacts the corner 109 of the base member 100. In this example, the component parts 502, 503, 504, 505 of the rail member 110 may include elongated bar that extend along corresponding sides of the base member 100 and contact one or more of the corners of the base member 100 including the corner 109.

In another example, as described herein, the rail member 110 may include an interior frame that extends along the first and second sides of the base member 100 and contacts the corner 109 of the base member 100. In this example, the component parts 502, 503, 504, 505 of the rail member 110 may include elongated portions that extend along corresponding sides of the base member 100 and contact one or more of the corners of the base member 100 including the corner 109.

In the example of FIGS. 5A-5B, the component parts 502, 503, 504, 505 of the rail member 110 may include contoured sides with contoured portions that are configured to couple with the contoured sides 102, 103, 104, 105 of the base member 100 when assembled thereto (e.g., as shown in FIG. 3A). The contoured features of the rail member 110 may vary in shape and contour.

FIGS. 6A-6D are diagrams illustrating cross-sectional views of example fastening mechanisms for a device, in accordance with aspects of the disclosure.

Figure 6A:
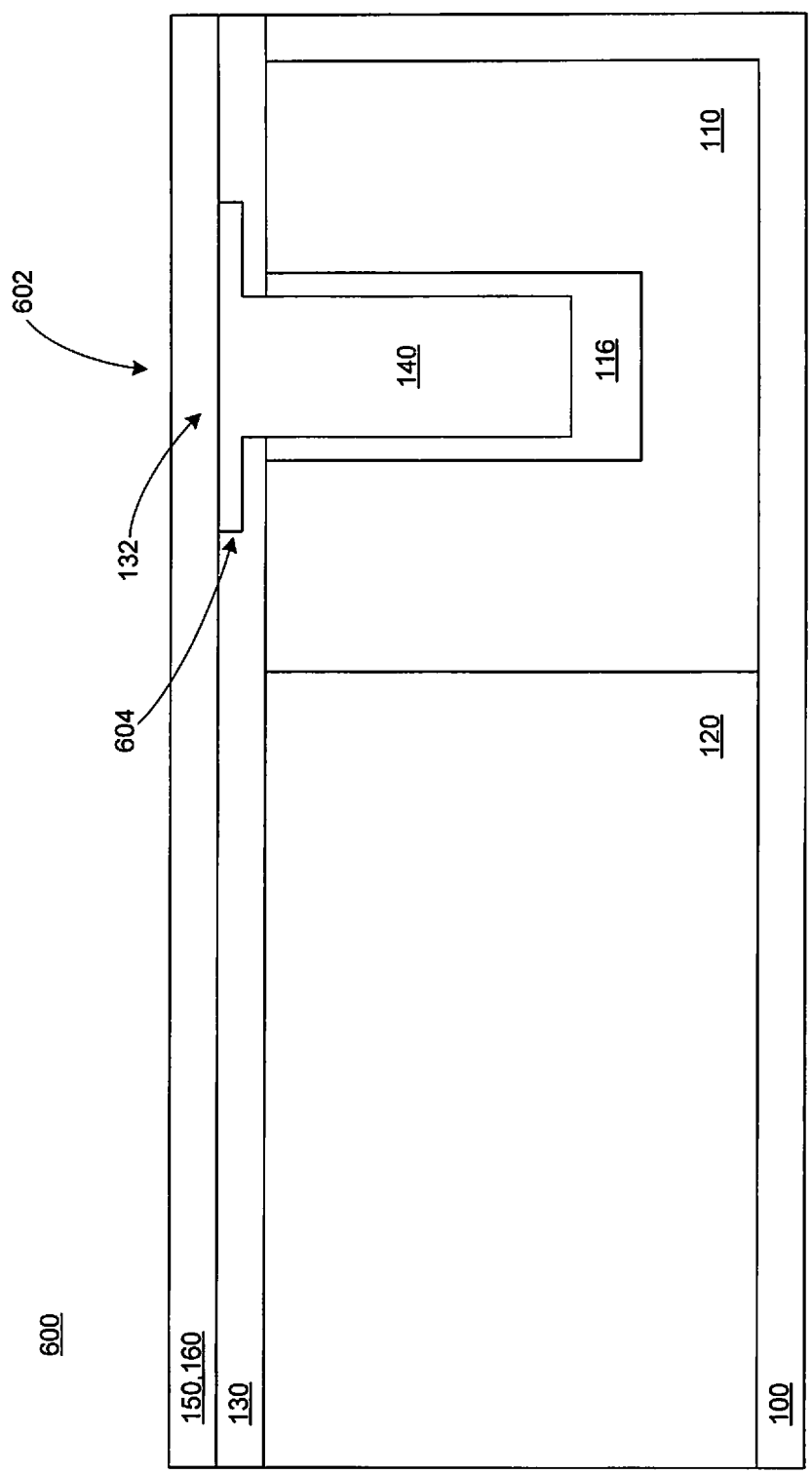
FIGS. 6A, 6B, 6C, 6D-1, and 6D-2 are diagrams illustrating cross-sectional views of example fastening mechanisms for a device, in accordance with aspects of the disclosure.

FIG. 6A is a diagram illustrating a cross-sectional view of an example fastening mechanism 602 for a device 600, in accordance with aspects of the disclosure.

In an example, the device 600 may include the base member 100 formed as a receptacle configured for receiving the internal circuitry 120. The device 600 may include the rail member 110 coupled to the base member 100. The rail member 110 may be positioned to contact an interior sidewall of the base member 100. The device 600 may include the enclosing member 130 coupled to the rail member 110 with the fasteners 140 to enclose the internal circuitry 120 disposed in the base member 100 between the enclosing member 130 and the base member 130.

In this example, the fastening mechanism 602 may include the fasteners 140 for assembling the enclosing member 130 to the rail member 110. The enclosing member 130 may include openings 132 formed in the enclosing member 130. The enclosing member 130 may be coupled to the rail member 110 with the fasteners 140 positioned through the openings 132 formed in the enclosing member 130 to enclose the internal circuitry 120. Further, the fasteners 140 may be configured to couple with the recesses 116 formed in the rail member 110 corresponding to the openings 132 formed in the enclosing member 130. In various examples, the fasteners 140 may include screws, rivets, or some other type of related fastener or combination thereof. In some examples, countersunk recesses 604 may be formed around the openings 132 formed in the enclosing member 130 so as to receive a head portion of the fasteners 140, such as screws or rivets, and provide a flush upper surface of the enclosing member 130 for contact with the lower surface of the display member 150 or the user interface member 160.

In an example, the display member 150 may be coupled to the enclosing member 130. In another example, the user interface member 160 may be coupled to the enclosing member 130, and the monitor member 170 may be coupled to the base member assembly with the one or more hinges 172.

Figure 6B:
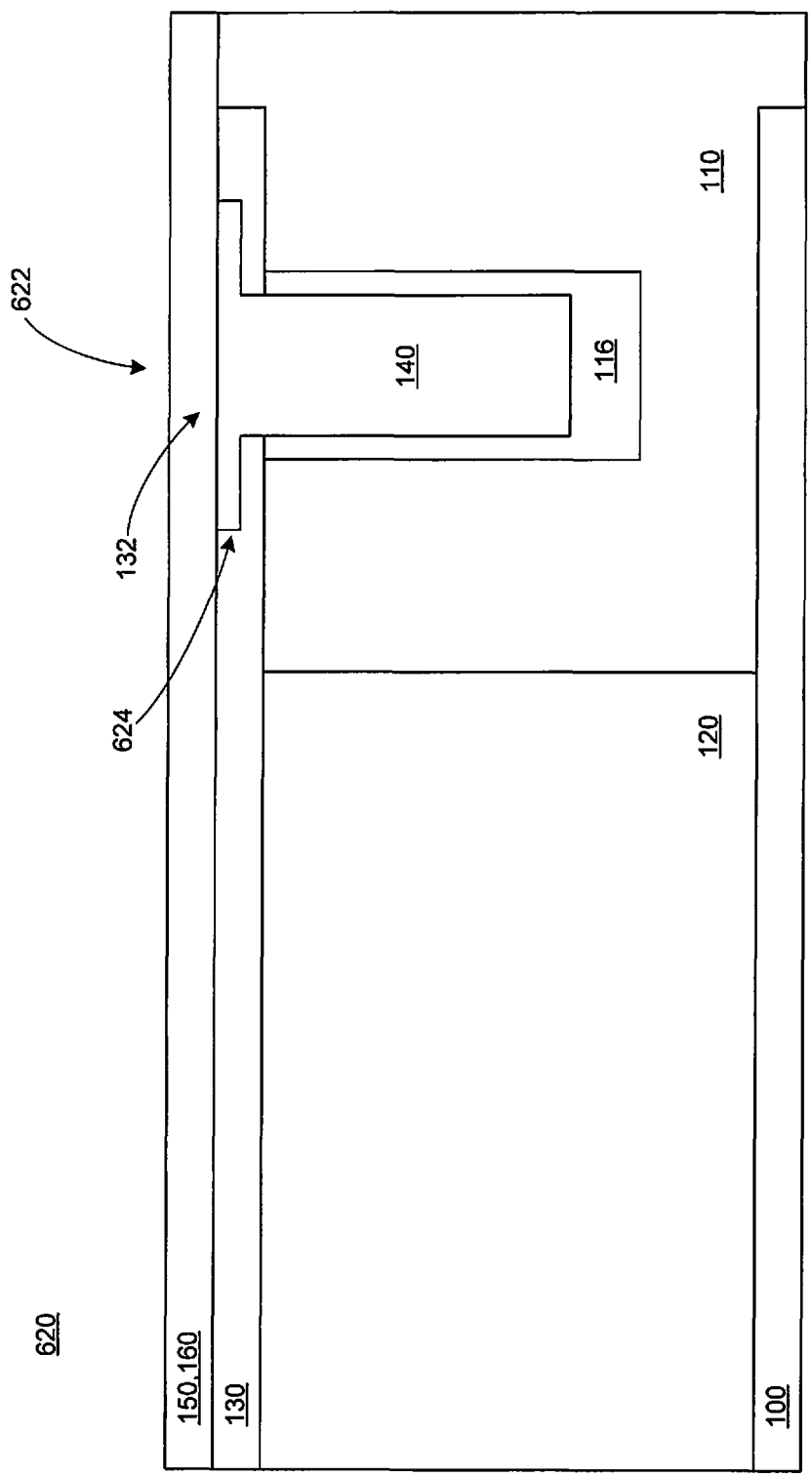

FIG. 6B is a diagram illustrating a cross-sectional view of another example fastening mechanism 622 for a device 620, in accordance with aspects of the disclosure.

In an example, the device 620 may include the base member 100 formed as a flat sheet for coupling to the rail member 110. Similarly, the device 620 may include the enclosing member 100 formed as another flat sheet for coupling to the rail member 110. As described in reference to FIG. 4A, the rail member 110 may include a perimeter frame having an interior region configured for receiving the internal circuitry 120. The assembly of the device 620 may include the enclosing member 130 coupled to the rail member 110 with the fasteners 140 to enclose the internal circuitry 120 within the interior region of the rail member 110 with the rail member 110 interposed between the enclosing member 130 and the base member 130.

In this example, the fastening mechanism 622 may include the fasteners 140 for assembling the enclosing member 130 to the rail member 110. The enclosing member 130 may include openings 132 formed in the enclosing member 130. The enclosing member 130 may be coupled to the rail member 110 with the fasteners 140 positioned through the openings 132 formed in the enclosing member 130 to enclose the internal circuitry 120. Further, the fasteners 140 may be configured to couple with the recesses 116 formed in the rail member 110 corresponding to the openings 132 formed in the enclosing member 130. In various examples, the fasteners 140 may include screws, rivets, or some other type of related fastener or combination thereof.

In some examples, countersunk recesses 624 may be formed around the openings 132 formed in the enclosing member 130 so as to receive a head portion of the fasteners 140, such as screws or rivets, and provide a flush upper surface of the enclosing member 130 for contact with the lower surface of the display member 150 or the user interface member 160.

In an example, the display member 150 may be coupled to the enclosing member 130. In another example, the user interface member 160 may be coupled to the enclosing member 130, and the monitor member 170 may be coupled to the base member assembly with the one or more hinges 172.

Figure 6C:
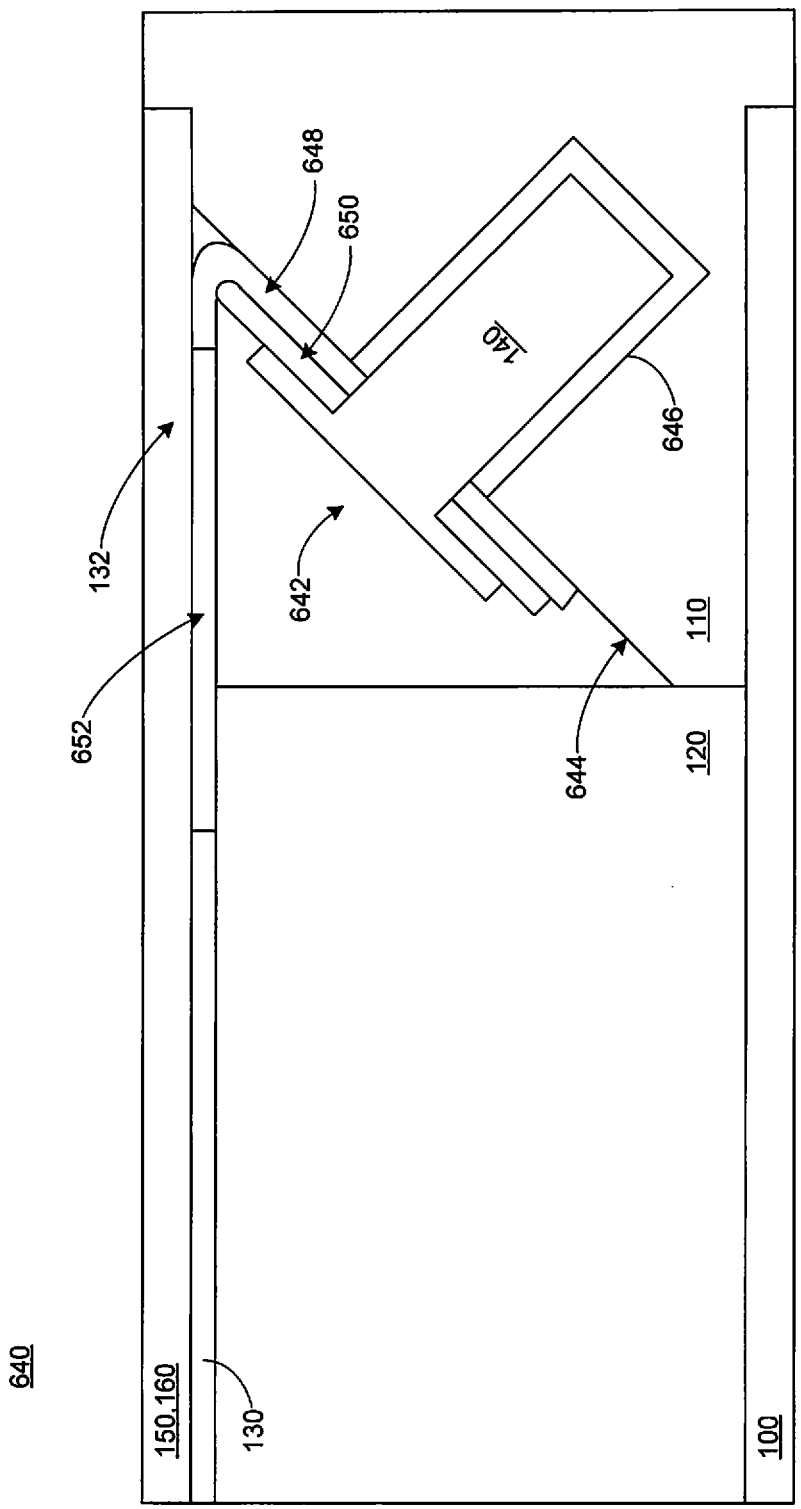

FIG. 6C is a diagram illustrating a cross-sectional view of another example fastening mechanism 642 for a device 640, in accordance with aspects of the disclosure.

In an example, the device 640 may include the base member 100 and the enclosing member 130 formed as flat sheets for coupling to the rail member 110. As described herein, the rail member 110 may include a perimeter frame having an interior region configured for receiving the internal circuitry 120. The assembly of the device 620 may include the enclosing member 130 coupled to the rail member 110 with the fasteners 140 to enclose the internal circuitry 120 within the interior region of the rail member 110 with the rail member 110 interposed between the enclosing member 130 and the base member 130.

As shown in the example of FIG. 6C, the rail member 110 may be formed with beveled interior sidewalls 644 with openings 646 formed therein. Further, as shown in FIG. 6C, the fasteners 140 may be coupled to the rail member 110 at an angle so as to be aligned with the beveled interior sidewall 644. In this example, the enclosing member 130 may include a bent portion 648 that may be coupled between a head of the fastener 140 and the beveled interior sidewall 644 of the rail member 110. Further, in this example, a stiffener 650 may be coupled between a head of the fastener 140 and the bent portion 648 of the enclosing member 130. The stiffener 650 may include a strip of rigid material (e.g., stainless steel, aluminum, etc.) to assist with tensioning the enclosing member and distribute a loading from the fastener 140 into the bend where the bent portion 648 bends from the flat sheet structural face of the enclosing member 130. Still further, in this example, openings or holes 652 may be formed in the enclosing member 130 for access to the fasteners 140.

In this example, the fastening mechanism 642 may include the fasteners 140 for assembling the enclosing member 130 to the rail member 110. The enclosing member 130 may include openings 132 formed in the enclosing member 130. The enclosing member 130 may be coupled to the rail member 110 with the fasteners 140 positioned through the openings 652 formed in the enclosing member 130 to enclose the internal circuitry 120. Further, the fasteners 140 may be configured to couple with the recesses 646 formed in the rail member 110 corresponding to the openings 652 formed in the enclosing member 130. In various examples, the fasteners 140 may include screws, rivets, or some other type of related fastener or combination thereof.

In an example, the display member 150 may be coupled to the enclosing member 130. In another example, the user interface member 160 may be coupled to the enclosing member 130, and the monitor member 170 may be coupled to the base member assembly with the one or more hinges 172.

Figures 1, 6D:
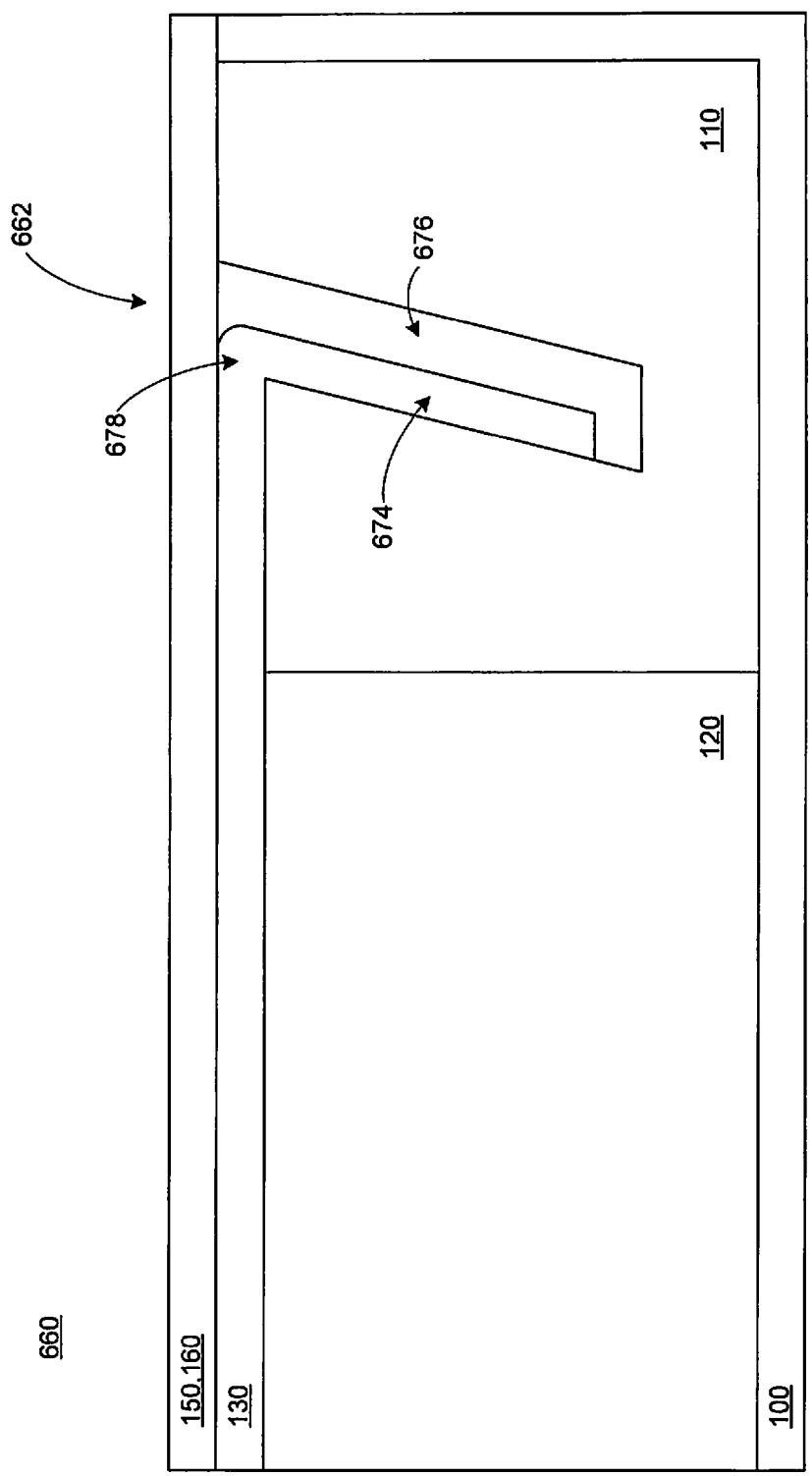
Figures 2, 6D:
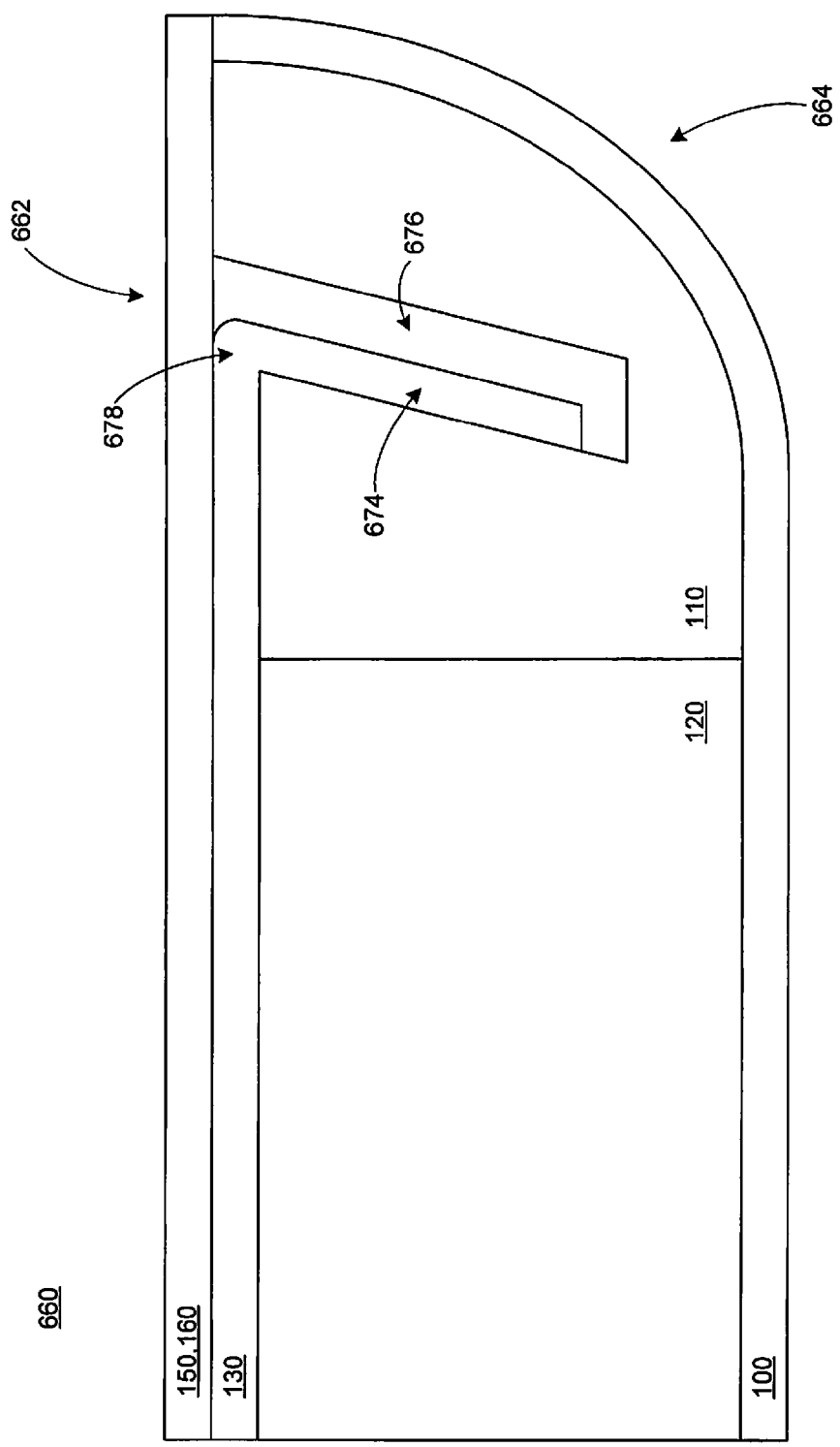
Figures 3, 6D:
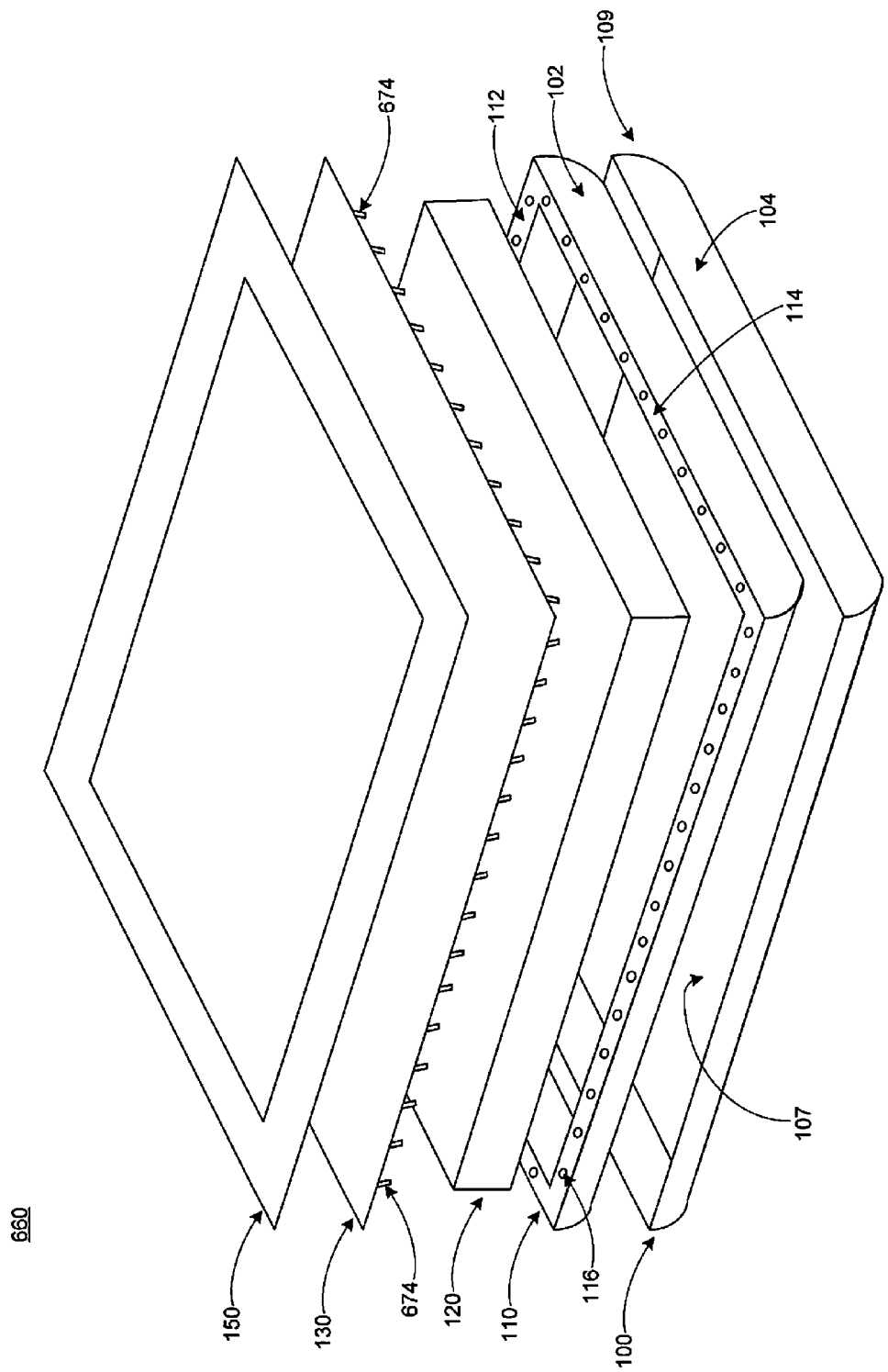

FIGS. 6D-1 and 6D-2 are diagrams illustrating cross-sectional views of another example fastening mechanism 662 for a device 660, in accordance with aspects of the disclosure. FIG. 6D-3 is a diagram illustrating an exploded view of the device 660, in accordance with aspects of the disclosure.

In particular, FIG. 6D-1 is a diagram illustrating a cross-sectional view of the fastening mechanism 662 coupled to the rail member 110. In this example, the device 660 may include the base member 100 formed as a receptacle configured for receiving the internal circuitry 120. The device 660 may include the rail member 110 coupled to the base member 100. The rail member 110 may be positioned to contact an interior sidewall of the base member 100. The device 660 may include the enclosing member 130 coupled to the rail member 110 with one or more hooked fasteners 674 to enclose the internal circuitry 120 disposed in the base member 100 between the enclosing member 130 and the base member 130. Further, in this example, the fastening mechanism 662 may include the hooked fasteners 674 for assembling the enclosing member 130 to the rail member 110. The enclosing member 130 may be coupled to the rail member 110 with the hooked fasteners 674 positioned to couple with one or more corresponding recesses 676 formed in the rail member 110 corresponding to the hooked fasteners 674 formed at an end of the enclosing member 130. In various examples, the hooked fasteners 674 may include a bent portion of the enclosing member 130.

In an aspect of the disclosure, thermal expansion/contraction may be used to pretension the device 660. For instance, in FIG. 6D-1, the enclosing member 130 may be heated to cause expansion in all directions. While the enclosing member 130 remains hot, heated, and thermally expanded, the hooked fastening member 674 of the enclosing member 130 may be hooked into or coupled with the angled recesses 676 formed in the rail member 110. Upon cooling or thermal contraction, the enclosing member 130 may contract and lock into place to thereby pretension the assembled structure.

In another aspect of the disclosure, the enclosing member 130 may include the one or more hooked fasteners 674 formed around its perimeter that are configured to couple with the one or more corresponding recesses 676 formed in the rail member 110 when the enclosing member 130 is thermally expanded. In an example, the bends may be referred to as hooks, wherein the hooks are part of the enclosing member 130, and the hooks may be formed by bending protruding tabs that extend from perimeter edges of the enclosing member 130. The hooks or hooked fasteners 674 may be configured to not change shape when the enclosing member 130 is heated. Instead, the hooks or hooked fasteners 674 may be configured to extend outward as the metal of the enclosing member 130 expands under temperature increase. Upon cooling, the enclosing member 130 may thermally contract and pull the hooks or hooked fasteners 674 inward so as to lock into the corresponding recesses 676 formed in the rail member 110.

In an example, the display member 150 may be coupled to the enclosing member 130 to overlap at least a portion of the rail member 110 including a portion of the angled recesses 676. In another example, the user interface member 160 may be coupled to the enclosing member 130, and the monitor member 170 may be coupled to the base member assembly with the one or more hinges 172.

Further, FIG. 6D-2 is a diagram illustrating another cross-sectional view of the fastening mechanism 662 coupled to the rail member 110. In this example, the device 660 may include the base member 100 formed as a receptacle configured for receiving the internal circuitry 120 and further contoured in a similar manner as the base member 100 shown in FIGS. 3A-3B. Thus, as shown in FIG. 6D-2, the base member 100 may include a contoured portion 664, and the rail member 110 may be contoured in a similar manner as with the base member 100 so that the rail member 110 may be coupled to the contoured base member 100, and the rail member 110 may be positioned to contact a contoured interior sidewall of the contoured base member 100. Similar to FIG. 6D-1, the device 660 may include the enclosing member 130 coupled to the rail member 110 with the hooked fasteners 674 to enclose the internal circuitry 120 disposed in the contoured base member 100 between the enclosing member 130 and the contoured base member 130. Further, in this example, the fastening mechanism 662 may include the hooked fasteners 674 for assembling the enclosing member 130 to the rail member 110. The enclosing member 130 may be coupled to the rail member 110 with the hooked fasteners 674 positioned to couple with one or more corresponding recesses 676 formed in the rail member 110 corresponding to the hooked fasteners 674 formed at an end of the enclosing member 130. In various examples, the hooked fasteners 674 may include a bent portion 678 of the enclosing member 130.

FIG. 6D-3 shows an exploded view of the example device 660 of FIGS. 6D-1, 6D-2 having torsional housing rigidity. In various implementations, the assembly shown in the example of FIGS. 6D-3 may be referred to as a base assembly, housing assembly, and/or an enclosure assembly including any type of structural assembly that may be used as a housing and/or an enclosure.

In the example of FIG. 6D-3, the base member 100 may include contoured sides 102, 103, 104, 105, and the rail member 110 may include contoured portions 112, 113, 114, 115 that are configured to couple with the sides 102, 103, 104, 105 of the base member 100 when assembled thereto. In some examples, the rail member 110 may be referred to as a perimeter rail that frames a perimeter of the base member 100.

In an implementation, the contoured features of the base member 100 provide an ergonomic aesthetic to the device 300. In various examples, the contoured features of the base member 100 may vary in shape and contour.

In the example of FIG. 6D-3, the user interface member 150 may be coupled to the enclosing member 130. Further, the device 660 may include an assembly of the base member 100, the rail member 110, the internal circuitry 120, the enclosing member 130, the hooked fasteners 674, and the user interface member 150. As described herein, in reference to FIGS. 6D-1, 6D-2, the assembly when assembled with the plurality of hooked fasteners 674 provides torsional housing rigidity.

Figure 7:
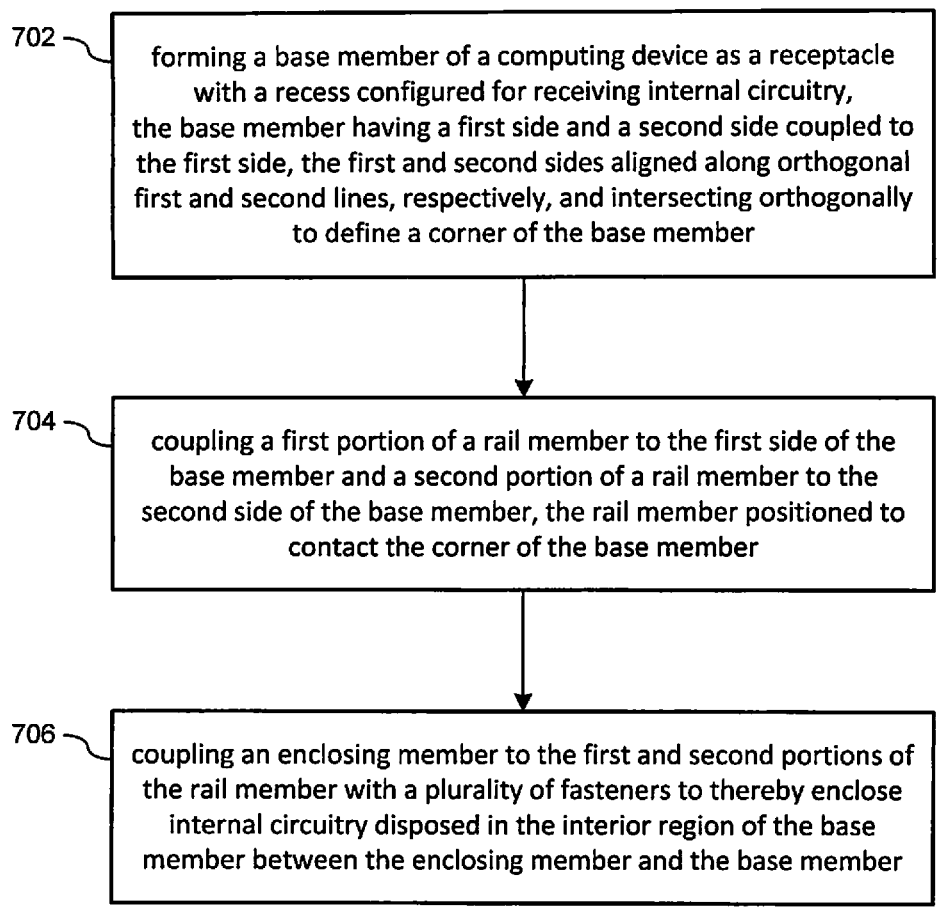
FIG. 7 is a process flow illustrating an example method for assembling an example device, in accordance with aspects of the disclosure.

FIG. 7 is a process flow illustrating an example method for assembling an example device (e.g., a computing device) with torsional housing rigidity, in accordance with aspects of the disclosure.

In the example of FIG. 7, operations 702-706 are illustrated as discrete operations occurring in sequential order. However, in other implementations, two or more of the operations 702-706 may occur in a partially or completely overlapping or parallel manner, or in a nested or looped manner, or may occur in a different order than that shown. Further, one or more additional operations, that may not be specifically illustrated in the example of FIG. 7, may also be included in some implementations, while in other implementations, one or more of the operations 702-706 may be considered optional or omitted.

In the example of FIG. 7, at 702, the method 700 may include forming a base member (e.g., base member 100) of a device (e.g., computing device) as a receptacle with a recess (e.g., recess 107) defining an interior region (e.g., interior space) configured for receiving internal circuitry (e.g., internal circuitry 120). The base member may include a first side (e.g., first side 102) and a second side (e.g., second side 104) coupled to the first side. The first and second sides may be aligned along orthogonal first and second lines, respectively, and intersect orthogonally to define a corner (e.g., corner 109) of the base member.

At 704, the method 700 may include coupling a first portion of a rail member (e.g., rail member 110) to the first side of the base member and a second portion of a rail member to the second side of the base member. The rail member may be positioned to contact the corner of the base member.

At 706, the method 700 may include coupling an enclosing member (e.g., enclosing member 130) to the first and second portions of the rail member with a plurality of fasteners (e.g., fasteners 140) to thereby enclose the internal circuitry disposed in the recess of the base member between the enclosing member and the base member. The assembly of the component parts of the device, when assembled with the plurality of fasteners 140, provides torsional housing rigidity. In various examples, the more fasteners used to couple the enclosing member to the framing member along the sides thereof provides more torsional housing rigidity.

In an implementation, the method 700 may include forming a plurality of openings (e.g., openings 132) in the enclosing member. The method 700 may include coupling the enclosing member to the rail member with the fasteners positioned through the openings formed in the enclosing member to thereby enclose the internal circuitry. The fasteners may include screws configured to couple with a plurality of recesses (e.g., recesses 116) having threads formed in the rail member corresponding to the openings formed in the enclosing member.

Figure 8:
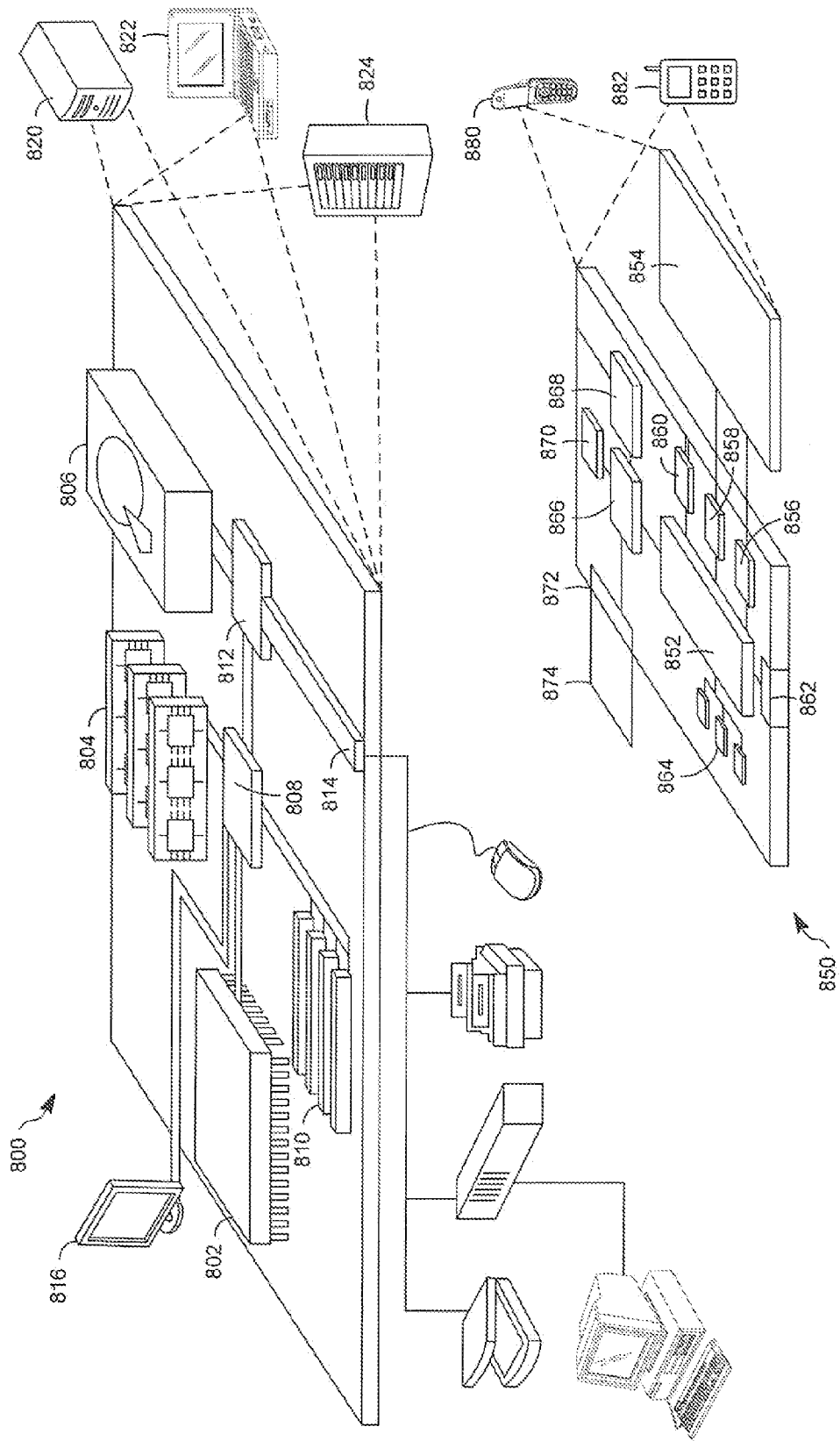
FIG. 8 is a block diagram illustrating example or representative computing devices and associated elements that may be used to implement one or more systems, devices, and methods of FIGS. 1-7, in accordance with aspects of the disclosure.

FIG. 8 is a diagram illustrating example or representative devices, such as computing devices, portable computing devices etc., and associated elements including various internal circuitry that may be used to implement one or more systems, devices, apparatuses, and methods of FIGS. 1-7, in accordance with aspects of the disclosure.

In an implementation, FIG. 8 shows an example of a computer device 800 and a mobile computer device 850 (e.g., mobile communication device including a low-power mobile communication device, such as, for example, mobile phone, cellular phone, etc.), which may be used in accordance with aspects, methods, and techniques, as described and provided herein. The computing device 800 may represent various forms of digital computers, such as personal computers, laptops, tablets, desktops, workstations, personal digital assistants, servers, blade servers, mainframes, and other appropriate computers. The computing device 850 may represent various forms of mobile devices, such as personal digital assistants, cellular telephones, smart phones, and other similar computing devices. The components shown herein, their connections and relationships, and their functions, are meant to be exemplary only, and are not meant to limit implementations described herein and/or claimed in this disclosure.

The computing device 800 may include one or more processors 802, memory 804, a storage device 806, a high-speed interface 808 connecting to memory 804 and high-speed expansion ports 810, and a low speed interface 812 connecting to low speed bus 814 and storage device 806. One or more of the components 802, 804, 806, 808, 810, and 812, are interconnected using various busses, and may be mounted on a common motherboard or in other manners as appropriate. In an implementation, the processor 802 may be configured to process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be utilized, as appropriate, along with multiple memories and types of memory. Further, multiple computing devices 800 may be connected, with the device providing portions of the necessary operations (e.g., as a server bank, a group of blade servers, or a multi-processor system).

The memory 804 may be configured to store information within the computing device 800. In an implementation, the memory 804 may comprise one or more volatile memory units. In another implementation, the memory 804 may comprise one or more non-volatile memory units. The memory 804 may comprise another form of non-transitory computer-readable medium, such as a magnetic or optical disk.

The storage device 806 may be configured for providing mass storage for the computing device 800. In an implementation, the storage device 806 may comprise a non-transitory computer-readable medium, such as a floppy disk device, a hard disk device, an optical disk device, or a tape device, a flash memory, or other similar solid state memory device, or an array of devices, including devices configured for use in a storage area network or various other configurations. In some implementations, a computer program product may be tangibly embodied in an information carrier. The computer program product may include instructions that, when executed, perform one or more methods, such as those described herein. In another implementation, the information carrier may comprise a non-transitory computer-readable medium or a non-transitory machine-readable medium, such as the memory 804, the storage device 806, or memory on the processor 802.

The high speed controller 808 may be configured to manage bandwidth-intensive operations for the computing device 800, while the low speed controller 812 may be configured to manage lower bandwidth-intensive operations. Such allocation of functions may be exemplary only. In an implementation, the high-speed controller 808 may be coupled to the memory 804, the display 816 (e.g., through a graphics processor or accelerator), and/or to the high-speed expansion ports 810, which may be configured to accept various expansion cards (not shown). In the implementation, low-speed controller 812 may be coupled to the storage device 806 and/or the low-speed expansion port 814, wherein the low-speed expansion port, which may include various communication ports (e.g., USB, Bluetooth, Ethernet, wireless Ethernet, etc.) may be coupled to one or more input/output devices, such as a keyboard, a pointing device, a scanner, or a networking device, such as a switch or router, e.g., through a network adapter.

The computing device 800 may be implemented in a number of different forms, in a manner as shown in FIG. 8. For example, the computing device 800 may be implemented as a standard server 820, or multiple times in a group of such servers. The computing device 800 may be implemented as part of a rack server system 824. In addition, the computing device 800 may be implemented in a personal computer (PC) such as a laptop computer 822. In another implementation, components from the computing device 800 may be combined with other components in a mobile device (not shown), such as device 850. One or more of such devices may include one or more of computing devices 800, 850, and an entire system may be made up of multiple computing devices 800, 850 communicating with one another.

The computing device 850 may include one or more processors 852, memory 864, an input/output device, such as a display 854, a communication interface 866, and a transceiver 868, among various other components. The device 850 may be provided with a storage device, such as a micro-drive or some other related device, to provide additional storage. One or more of the components 850, 852, 864, 854, 866, and 868 may be interconnected using various buses, and several of the components may be mounted on a common motherboard or in other manners as appropriate.

The processor 852 may be configured to execute instructions within the computing device 850, including instructions stored in the memory 864. The processor 852 may be implemented as a chipset of chips that include separate and multiple analog and digital processors. In an implementation, the processor 852 may provide for coordination of the other components of the device 850, such as control of user interfaces, applications run by device 850, and wireless communication by device 850.

The processor 852 may be configured to communicate with a user through a control interface 858 and a display interface 856 coupled to a display 854. The display 854 may comprise, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In an implementation, an external interface 862 may be provide in communication with the processor 852 to enable near area communication of device 850 with various other devices. In an example, the external interface 862 may provide for wired communication in some implementations, or for wireless communication in other implementations, and multiple interfaces may be utilized.

The memory 864 may be configured to store information within the computing device 850. The memory 864 may be implemented as one or more of a non-transitory computer-readable medium or media, one or more volatile memory units, or one or more non-volatile memory units. Expansion memory 874 may be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, in an example, expansion memory 874 may include instructions to carry out or supplement the processes described above, and may include secure information. Thus, for example, the expansion memory 874 may be provide as a security module for device 850, and may be programmed with instructions that permit secure use of device 850. Further, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

The device 850 may be configured to communicate wirelessly through communication interface 866, which may include digital signal processing circuitry where necessary. In an implementation, a communication interface 866 may provide for communications under various modes or protocols, such as GSM voice calls, SMS, EMS, or MMS messaging, CDMA, TDMA, PDC, WCDMA, CDMA2000, or GPRS, among others. In an example, such communication may occur, for example, through a radio-frequency transceiver 868. Further, short-range communication may occur, such as using a Bluetooth, WiFi, or other such transceiver (not shown). Still further, a GPS (Global Positioning System) receiver module 870 may provide additional navigation- and/or location-related wireless data to device 850, which may be used as appropriate by applications running on device 850.

The device 850 may be configured to communicate audibly using audio codec 860, which may receive spoken information from a user and convert it to usable digital information. In an example, an audio codec 860 may likewise generate audible sound for a user, such as through a speaker, e.g., in a handset of the device 850. In various implementations, such sound may include sound from voice telephone calls, may include recorded sound (e.g., voice messages, music files, etc.) and may include sound generated by applications operating on the device 850.

The computing device 850 may be implemented in a number of different forms, in a manner as shown in FIG. 8. For example, the computing device 850 may be implemented as a mobile communication device 880 including a cellular telephone and/or some other low power mobile communication devices. In another example, the computing device 850 may be implemented as part of a smart phone 882, personal digital assistant, or some other similar mobile device.

As such, various implementations of the systems, methods, and techniques described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a non-transitory machine-readable medium that is configured to receive machine instructions as a machine-readable signal. In various examples, the term "machine-readable signal" may refer to any signal used to provide machine instructions and/or data to a programmable processor.

In an implementation, to provide for interaction with a user, the systems, methods, and techniques described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other types of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In various examples, the systems, methods, and techniques as described herein may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems, methods, and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from one another and typically interact through a communication network. The relationship of client and server arises by virtue of computer programs running on the respective computers and having a client-server relationship to one another.

Further, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The above embodiments that have been described in particular detail are merely example or possible embodiments, and that there are many other combinations, additions, or alternatives that may be included.

The particular naming of the components, capitalization of terms, the attributes, data structures, or any other programming or structural aspect is not mandatory or significant, and the mechanisms that may be used to implement aspects of the disclosure or its features may have different names, formats, or protocols. Further, the system may be implemented via a combination of hardware and software, as described, or entirely in hardware elements. Further, any particular division of functionality between the various system components described herein is merely exemplary, and not mandatory; functions performed by a single system component may instead be performed by multiple components, and functions performed by multiple components may instead performed by a single component.

In accordance with aspects of the disclosure, some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Moreover, it has also proven convenient at times, to refer to these arrangements of operations as modules or by functional names, without loss of generality.

Unless specifically stated otherwise as apparent from the above discussion, throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:
1. A device comprising:
   a base member formed as a receptacle with a recess defining an interior region configured for receiving internal circuitry, the base member having a first side and a second side coupled to the first side, the first and second sides aligned along orthogonal first and second lines, respectively, and intersecting to define a corner of the base member;

a rail member having a first portion coupled to the first side of the base member and a second portion coupled to the second side of the base member, the rail member positioned to contact the corner of the base member; and an enclosing member coupled to the first and second portions of the rail member with a plurality of fasteners to thereby enclose the internal circuitry disposed in the recess of the base member between the enclosing member and the base member.

2. The device of claim 1, wherein:
the first portion of the rail member is coupled to an interior portion of the first side of the base member facing the recess, and
the second portion of the rail member is coupled to an interior portion of the second side of the base member facing the recess.

3. The device of claim 1, wherein the base member includes a stainless steel membrane.

4. The device of claim 1, wherein the rail member includes a plurality of component parts that are assembled to form the rail member.

5. The device of claim 1, wherein the rail member includes an elongated bar that extends along the first and second sides of the base member and contacts the corner of the base member.

6. The device of claim 1, wherein the rail member includes an interior frame that extends along the first and second sides of the base member and contacts the corner of the base member.

7. The device of claim 1, wherein the rail member is coupled to the base member with at least one of a bonding agent, an adhesive, solder, and at least one fastener including at least one of a rivet and a screw.

8. The device of claim 1, wherein the rail member includes at least one of aluminum, titanium, magnesium, chromoly, and stainless steel.

9. The device of claim 1, wherein the enclosing member is formed as a flat sheet for coupling with the rail member with the internal circuitry disposed between the enclosing member and the base member.

10. The device of claim 1, wherein the enclosing member includes a stainless steel membrane.

11. The device of claim 1, wherein:
the enclosing member includes a plurality of openings formed in the enclosing member, and
the enclosing member is coupled to the rail member with the fasteners positioned through the openings formed in the enclosing member to thereby enclose the internal circuitry.

12. The device of claim 1, wherein:
the enclosing member includes a plurality of openings formed in the enclosing member, and
the fasteners include screws configured to couple with a plurality of recesses having threads formed in the rail member corresponding to the openings formed in the enclosing member.

13. The device of claim 1, wherein:
the device includes a portable computing device including at least one of a laptop, a tablet, and a mobile phone, and
the internal circuitry includes at least one processor and at least one memory.

14. The device of claim 1, further comprising a user interface component including at least one of a display, a touch display, a touch sensor, a touch pad, a keyboard, and a trackpad.

15. A method for assembling a computing device, comprising:
forming a base member of the computing device as a receptacle with a recess defining an interior region configured for receiving internal circuitry, the base member having a first side and a second side coupled to the first side, the first and second sides aligned along orthogonal first and second lines, respectively, and intersecting to define a corner of the base member;
coupling a first portion of a rail member to the first side of the base member and a second portion of a rail member to the second side of the base member, the rail member positioned to contact the corner of the base member; and
coupling an enclosing member to the first and second portions of the rail member with a plurality of fasteners to thereby enclose the internal circuitry disposed in the recess of the base member between the enclosing member and the base member.

16. The method of claim 15, wherein:
the base member includes a first stainless steel membrane,
the rail member includes an interior frame that extends along the first and second sides of the base member, the rail member including at least one of aluminum, titanium, magnesium, chromoly, and stainless steel, and
the enclosing member includes a second stainless steel membrane.

17. The method of claim 15, further comprising:
coupling the rail member to the base member with at least one of a bonding agent, an adhesive, solder, and at least one fastener including at least one of a rivet and a screw.

18. The method of claim 15, further comprising:
forming a plurality of openings in the enclosing member; and
coupling the enclosing member to the rail member with the fasteners positioned through the openings formed in the enclosing member to thereby enclose the internal circuitry,
the fasteners including screws configured to couple with a plurality of recesses having threads formed in the rail member corresponding to the openings formed in the enclosing member.

19. The method of claim 15, wherein:
the internal circuitry includes at least one processor and at least one memory;
the computing device includes a portable computing device including at least one of a laptop, a tablet, and a mobile phone, and
the computing device includes a user interface component including at least one of a display, a touch sensor, a touch pad, a keyboard, and a track pad.

20. An apparatus comprising:
internal circuitry including at least one processor and at least one memory;
a first structural housing formed with at least one compartment defining an interior space configured for retaining the internal circuitry, the at least one compartment having first and second interior sides that intersect orthogonally to form a corner;
a framing member coupled to the first and second interior sides of the at least one compartment and continuously bending within a contour of the corner, the framing member having first and second elongated portions extending orthogonally from the corner; and a second structural housing formed as an enclosure for coupling to the first and second elongated portions of the framing member with a plurality of fasteners to thereby enclose the internal circuitry interposed between the first and second structural housings.

21. The device of claim 1, wherein the rail member is separate from the base member.

22. The device of claim 1, wherein the rail member is a unitary component including the first portion and the second portion.

23. The device of claim 22, wherein the first portion is coupled to the second portion, the rail member includes a third portion coupled to the second portion and aligned parallel to the first portion.

* * * * *